(12) United States Patent
Ben-Ner et al.

(10) Patent No.: US 11,089,745 B2
(45) Date of Patent: Aug. 17, 2021

(54) SYSTEMS AND METHODS FOR PLANNING CROP IRRIGATION

(71) Applicant: Supplant Ltd., Afula (IL)

(72) Inventors: Zohar Ben-Ner, Kfar Yehoshua (IL); Agustin Pimstein, Tel-Aviv (IL); Leonid Slavkin, Haifa (IL); Zhenyu Xu, Hefei (CN)

(73) Assignee: Supplant Ltd., Afula (IL)

( * ) Notice: Subject to any disclaimer, the term of this patent is extended or adjusted under 35 U.S.C. 154(b) by 164 days.

(21) Appl. No.: 16/494,785

(22) PCT Filed: Mar. 19, 2018

(86) PCT No.: PCT/IL2018/050314
§ 371 (c)(1),
(2) Date: Sep. 17, 2019

(87) PCT Pub. No.: WO2018/173045
PCT Pub. Date: Sep. 27, 2018

(65) Prior Publication Data
US 2020/0241579 A1 Jul. 30, 2020

Related U.S. Application Data

(60) Provisional application No. 62/473,580, filed on Mar. 20, 2017.

(51) Int. Cl.
*G05D 11/00* (2006.01)
*A01G 25/16* (2006.01)
(Continued)

(52) U.S. Cl.
CPC .......... *A01G 25/16* (2013.01); *A01G 25/167* (2013.01); *C10M 107/34* (2013.01);
(Continued)

(58) Field of Classification Search
CPC ........ A01G 22/00; A01G 7/00; A01G 25/167; A01G 25/16; G06Q 10/00; G05B 15/02; G05D 7/0676
See application file for complete search history.

(56) References Cited

U.S. PATENT DOCUMENTS 5,870,302 A * 2/1999 Oliver .................. A01G 25/167
700/11
6,314,640 B1 11/2001 Yoshida et al.
(Continued)

FOREIGN PATENT DOCUMENTS

WO WO 2018/173045 9/2018

OTHER PUBLICATIONS

International Preliminary Report on Patentability dated Oct. 3, 2019 From the International Bureau of WIPO Re. Application No. PCT/IL2018/050314. (7 Pages).
(Continued)

*Primary Examiner* — Tuan A Vu

(57) ABSTRACT

There is provided a method of planning irrigation, comprising: performing for a certain interval of time: computing a value of a crop evapotranspiration parameter indicative of an amount of water consumed by a reference crop, computing a value of a potential evapotranspiration parameter indicative of weather conditions associated with the field of the reference crop, computing a value of a dynamic crop coefficient for the reference crop based on the crop evapotranspiration parameter and the potential evapotranspiration parameter, and providing the dynamic crop coefficient computed for the certain time interval of time of the reference crop that corresponds to a target time interval of a target growing season of the target crop, wherein the target crop is growing in a target field which is geographically distinct from the reference field, and outputting instructions for
(Continued)

irrigation of the target crop according to an irrigation plan based on the dynamic crop coefficient.

20 Claims, 14 Drawing Sheets

(51) Int. Cl.
| | |
|---|---|
| *C10M 107/34* | (2006.01) |
| *C10M 141/08* | (2006.01) |
| *G05B 15/02* | (2006.01) |
| *G05D 7/06* | (2006.01) |
| *C10N 30/10* | (2006.01) |
| *C10N 40/04* | (2006.01) |
| *C10N 40/08* | (2006.01) |
| *C10N 40/25* | (2006.01) |
| *C10N 40/30* | (2006.01) |
| *G06Q 10/00* | (2012.01) |
| *A01G 22/00* | (2018.01) |
| *A01G 7/00* | (2006.01) |

(52) U.S. Cl.
CPC ........... *C10M 141/08* (2013.01); *G05B 15/02* (2013.01); *G05D 7/0676* (2013.01); *A01G 7/00* (2013.01); *A01G 22/00* (2018.02); *C10M 2209/1055* (2013.01); *C10M 2215/064* (2013.01); *C10M 2219/066* (2013.01); *C10N 2030/10* (2013.01); *C10N 2040/04* (2013.01); *C10N 2040/08* (2013.01); *C10N 2040/25* (2013.01); *C10N 2040/30* (2013.01); *G06Q 10/00* (2013.01); *Y02A 40/22* (2018.01)

(56) References Cited

U.S. PATENT DOCUMENTS

| | | | | |
|---|---|---|---|---|
| 7,742,862 | B2* | 6/2010 | Anderson | G06Q 10/00 |
| | | | | 701/50 |
| 2008/0091307 | A1* | 4/2008 | Dansereau | A01G 25/167 |
| | | | | 700/284 |
| 2009/0326723 | A1* | 12/2009 | Moore | A01G 25/16 |
| | | | | 700/284 |
| 2012/0290140 | A1* | 11/2012 | Groeneveld | A01G 22/00 |
| | | | | 700/284 |
| 2017/0038749 | A1 | 2/2017 | Mewes et al. | |
| 2018/0014452 | A1* | 1/2018 | Starr | A01G 7/00 |

OTHER PUBLICATIONS

International Search Report and the Written Opinion dated Jun. 18, 2018 From the International Searching Authority Re. Application No. PCT/IL2018/050314. (10 Pages).

Arnold "Crop Growth Module: Capturing Crop Yield Response to Water Deficit Within", Within Ph.D. Project Mathematical Programming Multi-Agent System Modeling: An Application to Water Resource Management, Institute for Agricultural Economics and Social Sciences in the Tropics and Subtropics, University of Hohenheim, Germany, p. 1-18, Dec. 31, 2006.

Supplementary European Search Report and the European Search Opinion dated Jan. 13, 2021 From the European Patent Office Re. Application No. 18771488.6. (8 Pages).

\* cited by examiner

| Hour | Minute | ETo (mm) | Hour | Minute | ETo (mm) |
|---|---|---|---|---|---|
| 4 | 30 | 0 | 11 | 45 | 0.739209 |
| 4 | 45 | 0.005689 | 12 | 0 | 0.732925 |
| 5 | 0 | 0.017692 | 12 | 15 | 0.730828 |
| 5 | 15 | 0.031087 | 12 | 30 | 0.721057 |
| 5 | 30 | 0.054669 | 12 | 45 | 0.711924 |
| 5 | 45 | 0.098206 | 13 | 0 | 0.702572 |
| 6 | 0 | 0.136132 | 13 | 15 | 0.68358 |
| 6 | 15 | 0.176578 | 13 | 30 | 0.66143 |
| 6 | 30 | 0.2203 | 13 | 45 | 0.635929 |
| 6 | 45 | 0.267352 | 14 | 0 | 0.607851 |
| 7 | 0 | 0.310779 | 14 | 15 | 0.477346 |
| 7 | 15 | 0.274475 | 14 | 30 | 0.278934 |
| 7 | 30 | 0.316105 | 14 | 45 | 0.141632 |
| 7 | 45 | 0.356441 | 15 | 0 | 0.169914 |
| 8 | 0 | 0.39597 | 15 | 15 | 0.08889 |
| 8 | 15 | 0.434446 | 15 | 30 | 0.124159 |
| 8 | 30 | 0.470474 | 15 | 45 | 0.073968 |
| 8 | 45 | 0.507645 | 16 | 0 | 0.204982 |
| 9 | 0 | 0.540773 | 16 | 15 | 0.253147 |
| 9 | 15 | 0.577785 | 16 | 30 | 0.141781 |
| 9 | 30 | 0.605777 | 16 | 45 | 0.058453 |
| 9 | 45 | 0.628196 | 17 | 0 | 0.052897 |
| 10 | 0 | 0.650869 | 17 | 15 | 0.048287 |
| 10 | 15 | 0.672301 | 17 | 30 | 0.044555 |
| 10 | 30 | 0.688551 | 17 | 45 | 0.032381 |
| 10 | 45 | 0.708212 | 18 | 0 | 0.0237 |
| 11 | 0 | 0.729942 | 18 | 15 | 0.013395 |
| 11 | 15 | 0.73604 | 18 | 30 | 0.009297 |
| 11 | 30 | 0.737114 | 18 | 45 | 0 |

FIG. 4

- Company:
- Field name:
- Plot ID:
- Location & coordinates:
- Elevation, Slope, Slope exposure:
- Field type (Provider or Follower):
- Greenhouse/Open Field/Orchard/other:
- Crop specie and Variety:
- Planting date:
- Agricultural produce purpose (e.g. wine, fresh fruit, industry, etc.):
- Spatial density (Distance between and along rows or Plants/m2):
- Planting system (e.g. trellis, tree training, pruning approach, etc.):
- Yield nominal load (i.e. High, medium, low):
- Soil physical description

| Horizon # and depth | Texture and separates% | Stone % | Compaction |
|---|---|---|---|
|  |  |  |  |
|  |  |  |  |
|  |  |  |  |

- Soil chemical description

| Item | Range |
|---|---|
| pH |  |
| Salinity (EC) |  |
| Carbonates |  |

- Irrigation method (Drip, Sprinkler, Pivot, Furrow, Flood, etc.):
- Irrigation flow rate for pressurize systems (L/H/emitter):
- Canopy condition

| Item | Description |
|---|---|
| Biomass (e.g. LAI, Vegetation Fraction, g/m2) |  |
| Nutritional condition |  |
| Sanitary condition (e.g. pests, weeds, etc.) |  |

FIG. 10

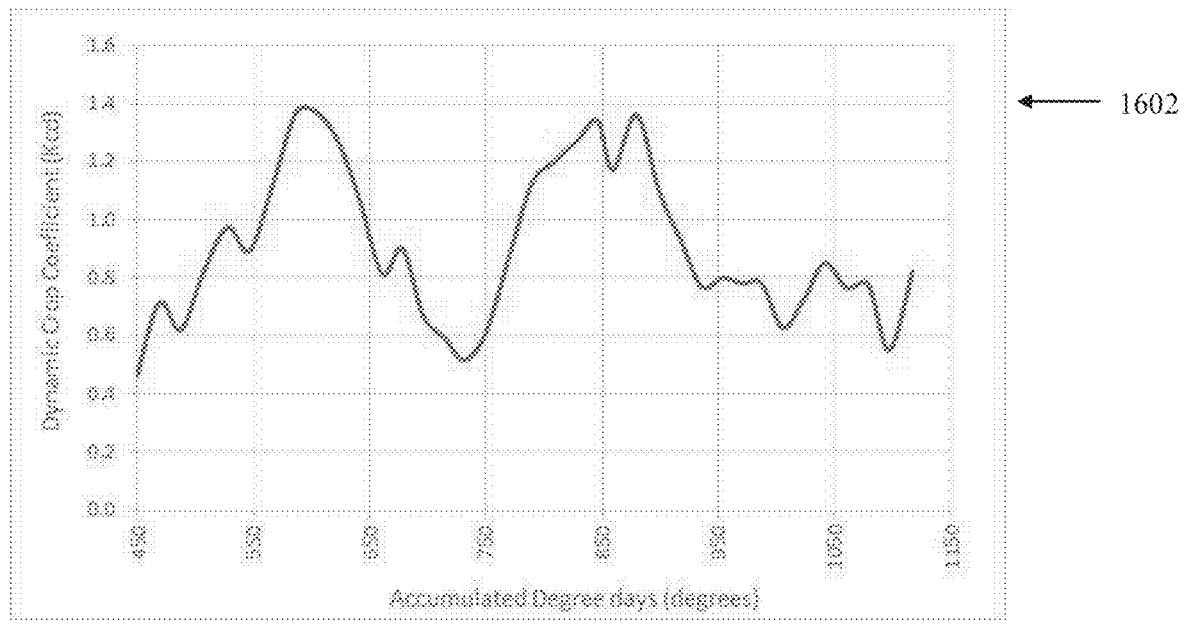
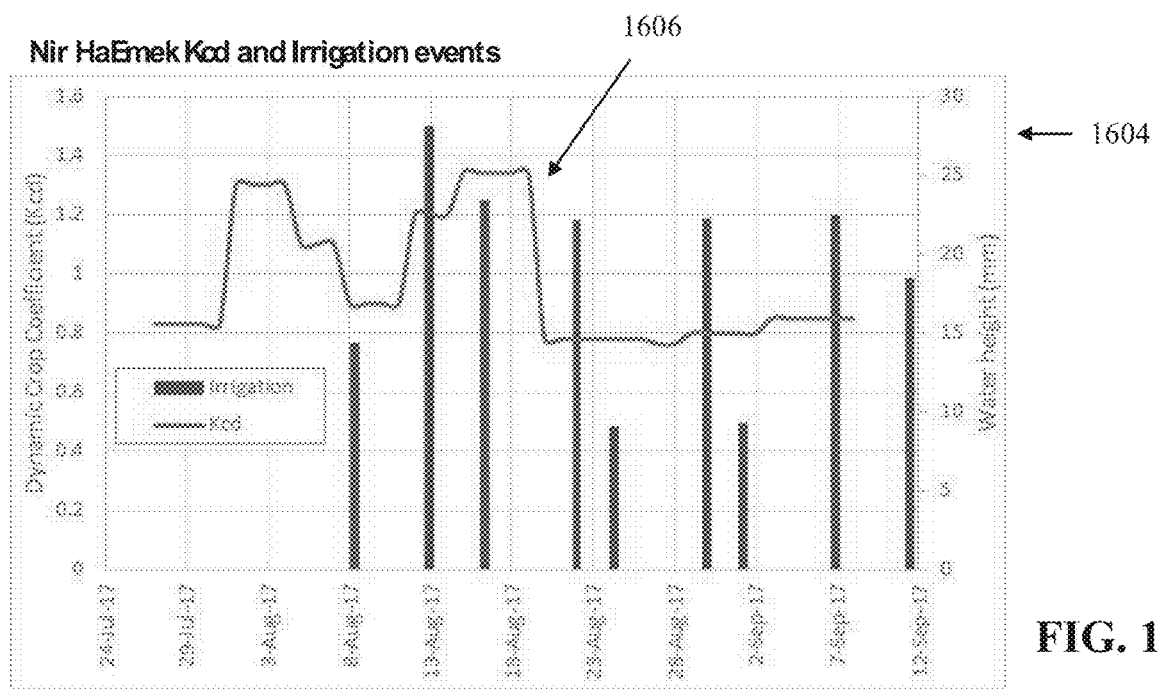
FIG. 16

SYSTEMS AND METHODS FOR PLANNING CROP IRRIGATION

RELATED APPLICATIONS

This application is a National Phase of PCT Patent Application No. PCT/IL2018/050314 having International filing date of Mar. 19, 2018, which claims the benefit of priority under 35 USC § 119(e) of U.S. Provisional Patent Application No. 62/473,580 filed on Mar. 20, 2017. The contents of the above applications are all incorporated by reference as if fully set forth herein in their entirety.

FIELD AND BACKGROUND OF THE INVENTION

The present invention, in some embodiments thereof, relates to irrigation systems and, more specifically, but not exclusively, to systems and methods for computation of parameters used for planning crop irrigation.

One of the basic questions of irrigation managers is how much water to replenish during each irrigation event and/or how much time to wait between irrigation events, depending on their irrigation approach. Inaccurate planning leads to unoptimized irrigation, which result in overwatering of crops or underwatering of crops, which lead to unoptimized production of quality crops.

SUMMARY OF THE INVENTION

According to a first aspect, a computer-implemented method of computing at least one value of a dynamic crop coefficient of a reference crop for determining an irrigation plan of a target crop, comprises: performing for a certain interval of time: computing a value of a crop evapotranspiration parameter from electrical signals outputted by at least one crop evapotranspiration sensor and indicative of an amount of water consumed by a reference crop, computing a value of a potential evapotranspiration parameter from electrical signals outputted by at least one potential evapotranspiration sensor and indicative of weather conditions associated with a reference field of the reference crop, computing a value of a dynamic crop coefficient for the reference crop based on the value of the crop evapotranspiration parameter and the value of the potential evapotranspiration parameter, wherein the value of the dynamic crop coefficient is associated with the certain interval of time, receiving a target interval of time of a target growing season, providing the dynamic crop coefficient computed for the certain time interval of time during a certain growing season of the reference crop that corresponds to the target time interval of the target growing season of the target crop, wherein the target crop is growing in a target field which is geographically distinct from the reference field where the reference crop is growing, and outputting instructions for irrigation of the target crop according to an irrigation plan based on the dynamic crop coefficient computed for the reference crop and the potential evapotranspiration parameter of the target crop's location.

According to a second aspect, a system for computing at least one value of a dynamic crop coefficient of a reference crop for determining an irrigation plan of a target crop, comprises: a non-transitory memory having stored thereon a code for execution by at least one hardware processor of a computing device, the code comprising: code for performing for a certain interval of time: computing a value of a crop evapotranspiration parameter from electrical signals outputted by at least one crop evapotranspiration sensor and indicative of an amount of water consumed by a reference crop, computing a value of a potential evapotranspiration parameter from electrical signals outputted by at least one potential evapotranspiration sensor and indicative of weather conditions associated with a reference field of the reference crop, computing a value of a dynamic crop coefficient for the reference crop based on the value of the crop evapotranspiration parameter and the value of the potential evapotranspiration parameter, wherein the value of the dynamic crop coefficient is associated with the certain interval of time, code for receiving a target interval of time of a target growing season, code for providing the dynamic crop coefficient computed for the certain time interval of time during a certain growing season of the reference crop that corresponds to the target time interval of the target growing season of the target crop, wherein the target crop is growing in a target field which is geographically distinct from the reference field where the reference crop is growing, and code for outputting instructions for irrigation of the target crop according to an irrigation plan based on the dynamic crop coefficient computed for the reference crop and the potential evapotranspiration parameter of the target crop's location.

According to a third aspect, a computer program product for computing at least one value of a dynamic crop coefficient of a reference crop used to determine an irrigation plan of a target crop, comprises: a non-transitory memory having stored thereon a code for execution by at least one hardware processor of a computing device, the code comprising: instructions for performing for a certain interval of time: computing a value of a crop evapotranspiration parameter from electrical signals outputted by at least one crop evapotranspiration sensor and indicative of an amount of water consumed by a reference crop, computing a value of a potential evapotranspiration parameter from electrical signals outputted by at least one potential evapotranspiration sensor and indicative of weather conditions associated with a reference field of the reference crop, computing a value of a dynamic crop coefficient for the reference crop based on the value of the crop evapotranspiration parameter and the value of the potential evapotranspiration parameter, wherein the value of the dynamic crop coefficient is associated with the certain interval of time, instructions for receiving a target interval of time of a target growing season, instructions for providing the dynamic crop coefficient computed for the certain time interval of time during a certain growing season of the reference crop that corresponds to the target time interval of the target growing season of the target crop, wherein the target crop is growing in a target field which is geographically distinct from the reference field where the reference crop is growing, and instructions for outputting instructions for irrigation of the target crop according to an irrigation plan based on the dynamic crop coefficient computed for the reference crop and the potential evapotranspiration parameter of the target crop's location.

At least some of the systems and/or methods and/or code instructions stored in a data storage device executable by one or more hardware processors described herein provide a technical solution to the technical problem of optimizing water resources for irrigating a target crop, for example, producing high quality crops with a precise amount of water. In particular, the technical problem relates to planning water resources for applying irrigation events to the target crop without necessarily measuring the crop coefficient for the target crop, for example, without crop evapotranspiration sensors installed in the target field of the target crop.

The technical problem may relate to determining the water irrigation pattern to apply to the crop. For example in practice, the actual irrigation efficiency of drip irrigation is significantly lower than the theoretical irrigation efficiency estimated at 90%. For example, the irrigation efficient of large landholders growing a large variety of crops on large farmland plots (greater than 100 Hectares) is estimated at 56%. The irrigation efficiency of reference farmers growing crops on medium sized farmland plots (10-15 Hectares) is estimated at 56%. The irrigation efficiency of small innovators and small scale farmers, which are early adopters of drip irrigation, is estimated at 30%. The irrigation efficiency of learners growing crops on small farmland plots (smaller than 5 Hectares), and last adopters of drip irrigation is estimated at 35%. The irrigation efficiency of young horticultural farmers growing crops on small farmland plots (smaller than 10 Hectares), which apply modern and updated technological practices, is estimated at 87%. The mismatch between the efficiency achieved in practice and the theoretical efficiency may be due to: imprecision of the application of the water at precise places at precise times according to behavior and practices of the farmers. At least some of the systems and/or methods and/or code instructions stored in a data storage device executable by one or more hardware processors described herein reduce or avoid the installation of crop evapotranspiration sensor(s) in additional geographically distinct target fields by performing computations for the geographically distinct target fields based on output of existing crop evapotranspiration sensor(s) that are installed in a field of a crop. The dynamic crop coefficient(s), which is computed based on the output(s) of the existing crop evapotranspiration sensor(s) and output(s) of potential evapotranspiration sensor(s), is used to plan irrigation events for target crops in target geographically distinct fields without installed crop evapotranspiration sensors. The dynamic crop coefficient(s) may be used to fine tune the irrigation events planned for short intervals of time for target crops of target fields without installed evapotranspiration sensors, for example, the irrigation events may be adjusted daily, weekly, or other intervals. Target fields without installed crop evapotranspiration sensors may dynamically plan the irrigation events to produce high quality crops with a precise amount of water based on the dynamic crop coefficient which is computed from another field growing the same or similar crop (with a statistically correlated and/or corrected field profile) based on data collected from evapotranspiration sensors installed in the other field. The amount of water to apply to the target field is computed according to the dynamic crop coefficient (obtained from the matched field) and value(s) of potential evapotranspiration parameter(s). When no potential evapotranspiration sensor (e.g., weather stations) are installed in the target fields, value(s) of potential evapotranspiration parameters may be obtained from a global data source, for example, a server storing data measured by a distributed network of weather stations.

The dynamic crop coefficient(s) provides a more accurate computation of the amount of water to apply to target crops, for relatively smaller time intervals, in comparison to standard methods, for example, that are based on computing the amount of water to use based on weather conditions and standard crop coefficient values (e.g. FAO Kc) which are tabulated and available from general crop tables and/or recommendations of local advisors. Such tables of crop coefficient values are not specific to the field being irrigated, and/or provide values for long intervals of time, which result in ineffective usage of water, due to under- or over-irrigating the crops. Kc integrates the effect of characteristics that distinguish a typical field crop from a grass reference or other standard plant reference which has a constant appearance and a complete ground cover. Consequently, different crops at different climates and in different soils will have different Kc coefficients, leading to inaccuracy of selecting the correct Kc.

In a further implementation form of the first, second, and third aspects, the target value of the crop evapotranspiration parameter is computed without output of a crop evapotranspiration sensor sensing an indication of the actual amount of water consumed by the target crop.

In a further implementation form of the first, second, and third aspects, the irrigation of the target crop is computed based on the dynamic crop coefficient without output of a potential evapotranspiration sensor installed in the target field and without output of a crop evapotranspiration sensor installed in the target field, wherein the value of the potential evapotranspiration parameter is obtained from a remote data server.

In a further implementation form of the first, second, and third aspects, the at least one crop evapotranspiration parameter is computed from output of a sensor that measures an indication of the amount of water used to irrigate the reference crop, wherein the reference crop is monitored by a system that measures plant growth and determines the amount of water used to irrigate the reference crop to avoid stress, wherein the amount of water used to irrigate the reference crop is statistically equivalent to the actual amount of water consumed by the reference crop.

In a further implementation form of the first, second, and third aspects, the value of the dynamic crop coefficient is associated with a reference field profile including at least one parameter of growing conditions of the reference crop corresponding to the growing conditions where the at least one crop evapotranspiration sensor and the at least one potential evapotranspiration sensor perform measurements, and further comprising: receiving a target field profile associated with the target crop, and matching the target field profile to the reference field profile of the reference crop, wherein the dynamic crop coefficient is provided according to the matched field profile.

In a further implementation form of the first, second, and third aspects, the method further comprises and/or the system further comprises code instructions for and/or the computer program product further comprises additional instructions for adjusting the dynamic crop coefficient provided for the target crop according to a computed correction parameter that provides a statistical correlation between the target field profile of the target crop and the reference field profile associated with the reference crop of the provided dynamic crop coefficient.

In a further implementation form of the first, second, and third aspects, the method further comprises and/or the system further comprises code instructions for and/or the computer program product further comprises additional instructions for computing a target value of the potential evapotranspiration parameter from electrical signals outputted by at least one potential evapotranspiration sensor and indicative of weather conditions associated with the target field of the target crop, computing a target value of the crop evapotranspiration parameter from the provided dynamic crop coefficient and the target value of the potential evapotranspiration parameter, wherein the irrigation of the target crop is planned according to the target value of the crop evapotranspiration parameter.

In a further implementation form of the first, second, and third aspects, the target interval of time of the target growing season is entered by a user via a graphical user interface (GUI) presented on a display of a client terminal, and the irrigation of the target crop is planned by the user via the GUI.

In a further implementation form of the first, second, and third aspects, the target interval of time of the target growing season and the target field profile are entered by a user via the GUI presented on a display of a client terminal.

In a further implementation form of the first, second, and third aspects, the dynamic crop coefficient is computed for a certain degree day corresponding to the certain interval of time, and wherein the dynamic crop coefficient is provided for the certain degree day corresponding to the target time interval of the target growing season, wherein the certain interval of time and the target time interval are on different calendar days.

In a further implementation form of the first, second, and third aspects, the method further comprises and/or the system further comprises code instructions for and/or the computer program product further comprises additional instructions for transmitting the instructions for irrigation of the target crop to a controller of an automated irrigation system for automated irrigation of the target crop according to the irrigation plan.

In a further implementation form of the first, second, and third aspects, the providing the dynamic crop coefficient, and outputting instructions for irrigation of the target crop are iterated over a plurality of different target time intervals.

In a further implementation form of the first, second, and third aspects, the method further comprises and/or the system further comprises code instructions for and/or the computer program product further comprises additional instructions for monitoring a health status of the target crop based on an analysis of satellite images captured of the target field, and generating an alert when the health status falls below a threshold.

In a further implementation form of the first, second, and third aspects, the method further comprises and/or the system further comprises code instructions for and/or the computer program product further comprises additional instructions for computing a plurality of dynamic crop coefficient values over a plurality of intervals of time during the certain growing season.

In a further implementation form of the first, second, and third aspects, the method further comprises and/or the system further comprises code instructions for and/or the computer program product further comprises additional instructions for computing a plurality of dynamic crop coefficient values over a plurality of intervals of time over a plurality of growing seasons.

In a further implementation form of the first, second, and third aspects, the value of the crop evapotranspiration parameter denotes an indication of an actual amount of water consumed by the reference crop grown under optimal conditions without stress during the certain interval of time.

In a further implementation form of the first, second, and third aspects, the value of the potential evapotranspiration parameter denotes a hypothetical grass reference crop resembling an extensive surface of green, well-watered grass of uniform height, actively growing, with full shade coverage of the ground.

In a further implementation form of the first, second, and third aspects, the interval of time is one day or shorter.

In a further implementation form of the first, second, and third aspects, the interval of time is seven days or shorter.

In a further implementation form of the first, second, and third aspects, values for the dynamic crop coefficient are computed per day according to a moving average of a window size for an interval of time of seven days or shorter.

In a further implementation form of the first, second, and third aspects, the crop evapotranspiration parameter is computed based on irrigation events according the at least one crop evapotranspiration sensor that measures the amount of water applied to the reference crop in an environment in which reference crop growth is measured and the amount of water used to irrigate the reference crop to avoid stress is computed by an automated monitoring system.

In a further implementation form of the first, second, and third aspects, the value of the dynamic crop coefficient for the certain interval of time is computed by dividing the value of the crop evapotranspiration parameter by the value of the potential evapotranspiration parameter.

In a further implementation form of the first, second, and third aspects, the field profile includes one or more of the following parameters: crop species, crop variety, geographical location, soil type, biomass development, nutritional condition, and cultural management.

In a further implementation form of the first, second, and third aspects, the field profile includes one or more of the following parameters: company, field name, plot ID, location & coordinates, elevation, field type, greenhouse/open field/orchard/other, crop species and variety, planting date, agricultural produce purpose, spatial density, planting system, soil physical description, soil chemical description, irrigation method, irrigation flow rate, slope and slope exposure, yield nominal load, and canopy condition.

In a further implementation form of the first, second, and third aspects, the method further comprises and/or the system further comprises code instructions for and/or the computer program product further comprises additional instructions for storing the computed value of the dynamic crop coefficient in a dynamic crop coefficient dataset hosted by a data storage device according to the certain interval of time of the certain growing season, and according to a reference field profile including a crop species, a crop variety, and at least one parameter of growing conditions of the reference crop corresponding to the growing conditions where the at least one crop evapotranspiration sensor and the at least one potential evapotranspiration sensor perform measurements, receiving a target field profile associated with the target crop, and matching the target field profile with the reference field profile stored in the dynamic crop coefficient dataset, wherein the dynamic crop coefficient is provided according to the matched field profile.

In a further implementation form of the first, second, and third aspects, the dynamic crop coefficient dataset stores a plurality of computed dynamic crop coefficients according to: each of a plurality of intervals of time of the certain growing season, and a plurality of combinations of parameters of the field profile.

In a further implementation form of the first, second, and third aspects, the dynamic crop coefficient dataset stores values of dynamic crop coefficients according to degree days corresponding to the certain interval of time, and wherein the provided dynamic crop coefficient corresponds to the degree days corresponding to the target time interval of the target growing season.

In a further implementation form of the first, second, and third aspects, the value of the crop evapotranspiration parameter is computed based on electrical signals output received by a first client terminal associated with the at least one crop evapotranspiration sensor, and the dynamic crop coefficient dataset is accessed to obtain the computed dynamic crop coefficient by a second client terminal that is not associated with the at least one crop evapotranspiration sensor.

In a further implementation form of the first, second, and third aspects, the value of the potential evapotranspiration parameter is obtained and/or computed based data obtained from a first weather server storing prevailing weather conditions for the geographical location of the reference crop, and the target value of the potential evapotranspiration parameter is obtained and/or computed based data obtained from a second weather server storing prevailing weather conditions for the geographical location of the target crop.

In a further implementation form of the first, second, and third aspects, the at least one crop evapotranspiration sensor comprises a lysimeter.

In a further implementation form of the first, second, and third aspects, the at least one crop evapotranspiration sensor comprises a sensor that measures an indication of the amount of water used to irrigate the crop, wherein the reference crop is monitored by a system that measures plant growth and determined the amount of water used to irrigate the reference crops to avoid stress.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a table of a sample of raw potential evapotranspiration value computed on the day of Jun. 14, 2016, based on measurements performed by potential evapotranspiration sensors of a weather station located within a reference mango field, for computing the dynamic crop coefficient, in accordance with some embodiments of the present invention;

FIG. 10 includes a list and tables of one or more parameters of a field profile, in accordance with some embodiments of the present invention;

FIG. 16 includes a graph of dynamic crop coefficient values for the reference field at Kfar Yoshua as a function of accumulated degree days and a graph of applied irrigation for the target field at Nir HaEmek planned by correlating days to the accumulated degree days at the reference field, in accordance with some embodiments.

DESCRIPTION OF SPECIFIC EMBODIMENTS OF THE INVENTION

Figure 1:
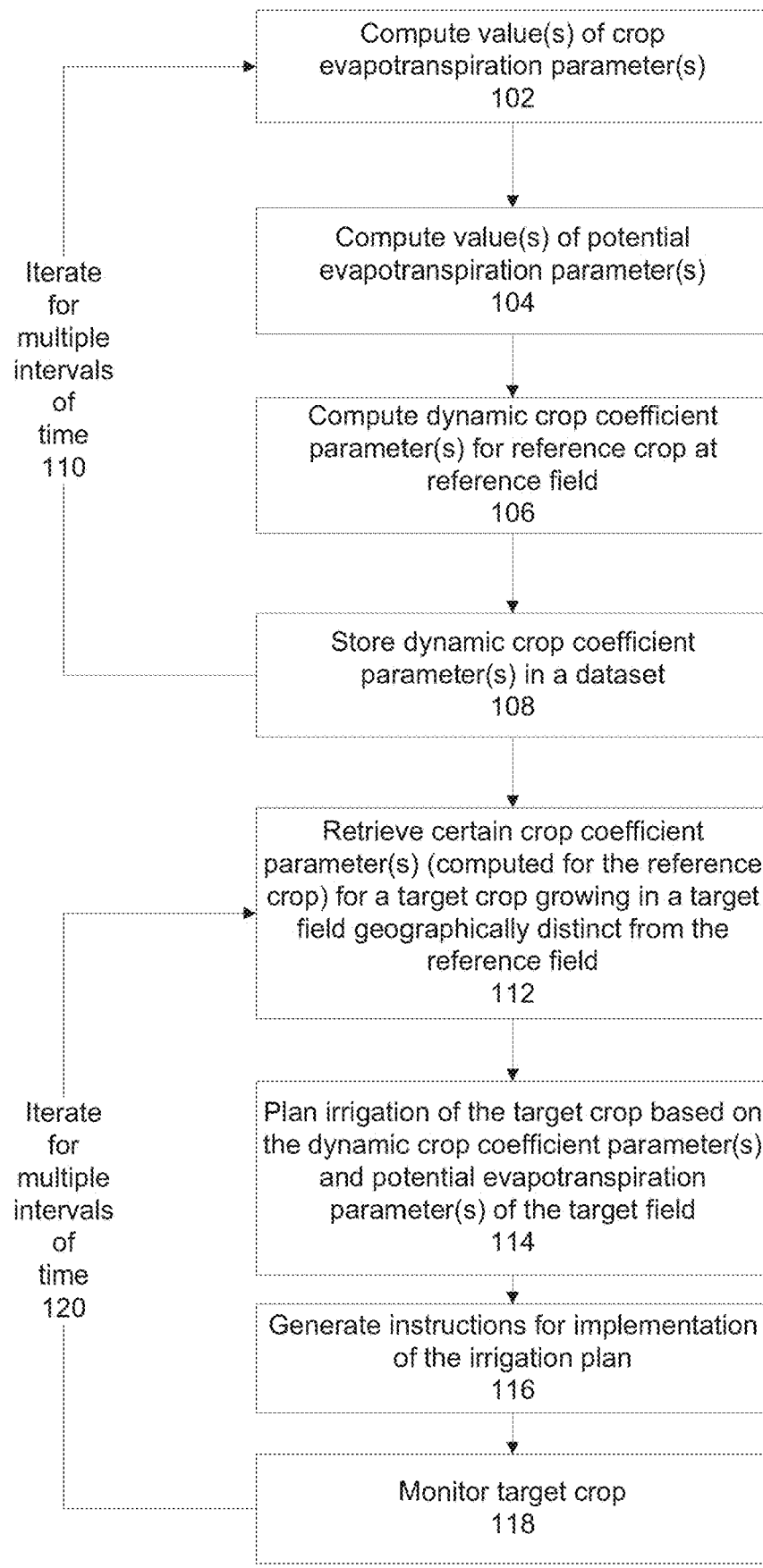
FIG. 1 is a flowchart of a method of computing value(s) of a dynamic crop coefficient from data outputted by crop evapotranspiration sensor(s) installed in association with a certain reference crop and providing the dynamic crop coefficient for planning irrigation events for a target crop, in accordance with some embodiments of the present invention.

The present invention, in some embodiments thereof, relates to irrigation systems and, more specifically, but not exclusively, to systems and methods for computation of parameters used for planning crop irrigation.

An aspect of some embodiments of the present invention relates to systems and/or methods and/or code instructions stored in a data storage device executable by one or more hardware processors for computing a dynamic crop coefficient during a certain interval of time of a growing season. Optionally, a target field profile of the target crop is matched (e.g., according to a correlation requirement, and/or statistically similarity, for example, a statistical distance) to one or more reference field profiles associated with the dynamic crop coefficient parameter(s). The amount of water to apply to the target crop is computed based on the dynamic crop coefficient parameter of the matched field profile.

As used herein the term crop or the term certain crop sometimes refers to the reference crop. As used herein the term field or the term certain field sometimes refers to the reference field. The dynamic crop coefficient is computed for the reference crop growing in the reference field, and is used to plan irrigation for the target crop growing in the target field.

The dynamic crop coefficient is computed based on value(s) of crop evapotranspiration parameter(s) determined based on electrical signals outputted by crop evapotranspiration sensor(s) which sense actual amount(s) of water consumed by the reference crop, and based on value(s) of potential evapotranspiration parameter(s) determined based on electrical signals outputted by potential evapotranspiration sensor(s).

The dynamic crop coefficient(s) are used to dynamically plan irrigation events for the certain interval of time of a subsequent growing season of a target crop located at a target field that is geographically distinct from the reference field of the reference crop, which may be located close by (e.g., within 1-1000 meters) or significantly far away (e.g., within 1-5000 kilometers away).

The amount of water to apply during each irrigation event for the target crop may be determined dynamically, for a certain interval of time. The amount of water to apply is determined according to the dynamic crop coefficient(s) and according to the potential evapotranspiration parameter. The value of the crop evapotranspiration parameter denotes the actual amount of water consumed by the reference crop grown under optimal conditions without stress during the certain interval of time, and denotes the amount of water to apply to the target crop. In many cases, no potential evapotranspiration sensors (e.g., weather station) are installed in the target field. The potential evapotranspiration parameter may be obtained from global data, for example, from a server that stores data obtained from a network of distributed weather stations. It is noted that as described herein, the amount of water to apply is computed using a different process in comparison to other standard methods, for example, that compute the amount of water according to data outputted by crop evapotranspiration sensor(s).

Data indicative of the actual amount of water consumed by the target crop may be unavailable, for example, crop evapotranspiration sensor(s) associated with the target field of the target crop are unavailable. For example, value(s) of the dynamic crop coefficient(s) computed for a certain week of a growing season of mangos in a certain field is computed based on output of a GBI™ system (as described below) installed in the mango field. The computed value(s) of the dynamic crop coefficient(s) is used to plan irrigation events of a certain phenological period of the following year's growing season for the target crop of mangos (it is noted that mangos is exemplary and not limiting the crop type) growing in a target field in another geographical location, without the GBI™ system (and/or other sensor) located at the target field. The dynamic crop coefficient(s) may be used to dynamically adjust the amount of water applied to the mango trees during irrigation events per interval of time, which optimizes water usage per interval of time, for example, reducing the amount of water needed to achieve optimal growth of the mango.

GBI™ monitors (continuously or periodically or based on events) data collected from the crop, soil and/or weather sensors installed in the reference field, analyzes the data, and sends irrigation commands directly to the valves in the reference field to deliver the computed irrigation plan. GBI™ uses data from sensors that measure one or more of: crop growth rate (e.g., trunk growth, stem growth, fruit growth), leaf temperature, soil moisture response, and environmental temperature-relatively humidity relationship.

Optionally, the computed value(s) of the dynamic crop coefficient(s) is corrected according to a computed correction parameter(s) that statistically correlates between a field profile of the crop and a target field profile of the target crop. The correction is performed after computation of the dynamic crop coefficient(s) is computed, to adjust the dynamic crop coefficient to the target crop according to the target field profile. The correction parameter(s) may account for variations in, for example, one or more of the following parameters which may be included within the field profile: crop species, crop variety, geographical location, soil type (e.g., texture, depth, organic matter), biomass development (e.g., measurable as leaf area index, remotely sensed normalized difference vegetation index), nutritional condition (e.g., nitrogen condition), and cultural management (e.g., plantation distances, canopy formation, and end-product). It is noted that the correction parameter(s) may account for variations in different but related species of crops growing on different fields with similar characteristics. For example, the correction parameter(s) may correct the dynamic crop coefficient of a certain field growing oranges to be applied to another geographically distinct field growing clementines, for example, when the fields are more similar to one another than to another field growing clementines.

Multiple values of the dynamic crop coefficient(s) are computed over the growing season of the crop, optionally a value of the dynamic crop coefficient is computed per defined interval of time, for example, per day, per week, or other intervals of time. Dynamic crop coefficients may be computed for different combinations of field profiles. The computed values of the dynamic crop coefficients may be stored in a dataset, for example, a database hosted by a network connected server that provides values of the dynamic crop coefficients to client terminals of entities that are unable to compute their own crop coefficients, for example, due to lack of crop evapotranspiration sensors installed in the target field growing the target crop associated with the client terminals. The client terminals use the dynamic crop coefficients obtained from the database to dynamically plan irrigation events for their associated target crops, which optimizes water resources and/or optimizes production of the target crop.

At least some of the systems and/or methods and/or code instructions stored in a data storage device executable by one or more hardware processors described herein provide a technical solution to the technical problem of optimizing water resources for irrigating a target crop, for example, producing high quality crops with a precise amount of water. In particular, the technical problem relates to planning water resources for applying irrigation events to the target crop without necessarily measuring the crop coefficient for the target crop, for example, without crop evapotranspiration sensors installed in the target field of the target crop.

The technical problem may relate to determining the water irrigation pattern to apply to the crop. For example in practice, the actual irrigation efficiency of drip irrigation is significantly lower than the theoretical irrigation efficiency estimated at 90%. For example, the irrigation efficient of large landholders growing a large variety of crops on large farmland plots (greater than 100 Hectares) is estimated at 56%. The irrigation efficiency of reference farmers growing crops on medium sized farmland plots (10-15 Hectares) is estimated at 56%. The irrigation efficiency of small innovators and small scale farmers, which are early adopters of drip irrigation, is estimated at 30%. The irrigation efficiency of learners growing crops on small farmland plots (smaller than 5 Hectares), and last adopters of drip irrigation is estimated at 35%. The irrigation efficiency of young horticultural farmers growing crops on small farmland plots (smaller than 10 Hectares), which apply modern and updated technological practices, is estimated at 87%. The mismatch between the efficiency achieved in practice and the theoretical efficiency may be due to: imprecision of the application of the water at precise places at precise times according to behavior and practices of the farmers.

At least some of the systems and/or methods and/or code instructions stored in a data storage device executable by one or more hardware processors described herein reduce or avoid the installation of crop evapotranspiration sensor(s) in additional geographically distinct target fields by performing computations for the geographically distinct target fields based on output of existing crop evapotranspiration sensor(s) that are installed in a field of a crop. The dynamic crop coefficient(s), which is computed based on the output(s) of the existing crop evapotranspiration sensor(s) and output(s) of potential evapotranspiration sensor(s), is used to plan irrigation events for target crops in target geographically distinct fields without installed crop evapotranspiration sensors. The dynamic crop coefficient(s) may be used to fine tune the irrigation events planned for short intervals of time for target crops of target fields without installed evapotranspiration sensors, for example, the irrigation events may be adjusted daily, weekly, or other intervals. Target fields without installed crop evapotranspiration sensors may dynamically plan the irrigation events to produce high quality crops with a precise amount of water based on the dynamic crop coefficient which is computed from another field growing the same or similar crop (with a statistically correlated and/or corrected field profile) based on data collected from evapotranspiration sensors installed in the other field. The amount of water to apply to the target field is computed according to the dynamic crop coefficient (obtained from the matched field) and value(s) of potential evapotranspiration parameter(s). When no potential evapotranspiration sensor (e.g., weather stations) are installed in the target fields, value(s) of potential evapotranspiration parameters may be obtained from a global data source, for example, a server storing data measured by a distributed network of weather stations.

The dynamic crop coefficient(s) provides a more accurate computation of the amount of water to apply to target crops, for relatively smaller time intervals, in comparison to standard methods, for example, that are based on computing the amount of water to use based on weather conditions and standard crop coefficient values (e.g. FAO Kc) which are tabulated and available from general crop tables and/or recommendations of local advisors. Such tables of crop coefficient values are not specific to the field being irrigated, and/or provide values for long intervals of time, which result in ineffective usage of water, due to under- or over-irrigating the crops. Kc integrates the effect of characteristics that distinguish a typical field crop from a grass reference or other standard plant reference which has a constant appearance and a complete ground cover. Consequently, different crops at different climates and in different soils will have different Kc coefficients, leading to inaccuracy of selecting the correct Kc.

At least some of the systems and/or methods and/or code instructions described herein provide a new, useful, and non-conventional technique for using crop evapotranspiration sensor(s) and/or potential evapotranspiration sensor(s) located within the reference field to compute the dynamic crop coefficient parameter which is used to plan irrigation of the target field.

At least some of the systems and/or methods and/or code instructions described herein relate to a specific, structured GUI paired with a prescribed functionality directly related to the GUI's structure that is addressed to and resolves the specifically identified technical problem.

At least some of the systems and/or methods and/or code instructions stored in a storage device executed by one or more processors described here compute the dynamic crop coefficient for defined time intervals (e.g., based on calendar days) and/or for degree days which may correlate to the defined time intervals, which is used, in association with local potential evapotranspiration data retrieved from a weather station or weather data provider, to fine tune irrigation for target crops, thereby optimizing water resource consumption, for example, in comparison to standard Kc values.

At least some of the systems and/or methods and/or code instructions described herein improve the functioning of a client terminal (e.g., mobile device) and/or computing device, by enabling a user to quickly and easily plan irrigation for a target field, optionally via an improved GUI that implements a particular manner for planning irrigation of the target field based on the dynamic crop coefficient computed according to the reference field. The irrigation is planned without requiring input from crop evapotranspiration sensors installed in the target field.

At least some of the systems and/or methods and/or code instructions stored in a storage device executed by one or more processors described here improve an underlying process within the technical field of crop irrigation, in particular, within the field of optimizing water resources for growing high quality crops.

At least some of the systems and/or methods and/or code instructions stored in a storage device executed by one or more processors described here do not simply describe the computation of values of the dynamic crop coefficient using a mathematical operation and receiving and storing data, but combine the acts of using outputs of crop evapotranspiration sensor(s) and outputs of potential evapotranspiration sensor(s), and providing the dynamic crop coefficients to plan irrigation events for a crop growing in a target field without installed crop evapotranspiration sensors. By this, at least some of the systems and/or methods and/or code instructions stored in a storage device executed by one or more processors described here go beyond the mere concept of simply retrieving and combining data using a computer.

At least some of the systems and/or methods and/or code instructions stored in a storage device executed by one or more processors described herein are tied to physical real-life components, including one of more of: crop evapotranspiration sensor(s), potential evapotranspiration sensor(s), a hardware processor that executes code instructions to compute the dynamic crop coefficient, and a data storage device (e.g., server) that stores a dataset of computed dynamic crop coefficients.

At least some of the systems and/or methods and/or code instructions stored in a storage device executed by one or more processors described herein create new data in the form of the dynamic crop coefficient which is used in association with local potential evapotranspiration data retrieved from a weather station or weather data provider to compute water requirements for a target crop growing in a target field for which direct measurements performed by crop evapotranspiration sensor(s) is unavailable.

Accordingly, at least some of the systems and/or methods and/or code instructions described herein are inextricably tied to computing technology and/or physical components to overcome an actual technical problem arising in management of water resources for irrigation of crops.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the singular terms coefficient, value, and parameter may sometimes be interchanged with the plural terms coefficients, values, and parameters, for example, multiple values of the dynamic crop coefficient may be integrated into a single value.

Figure 2:
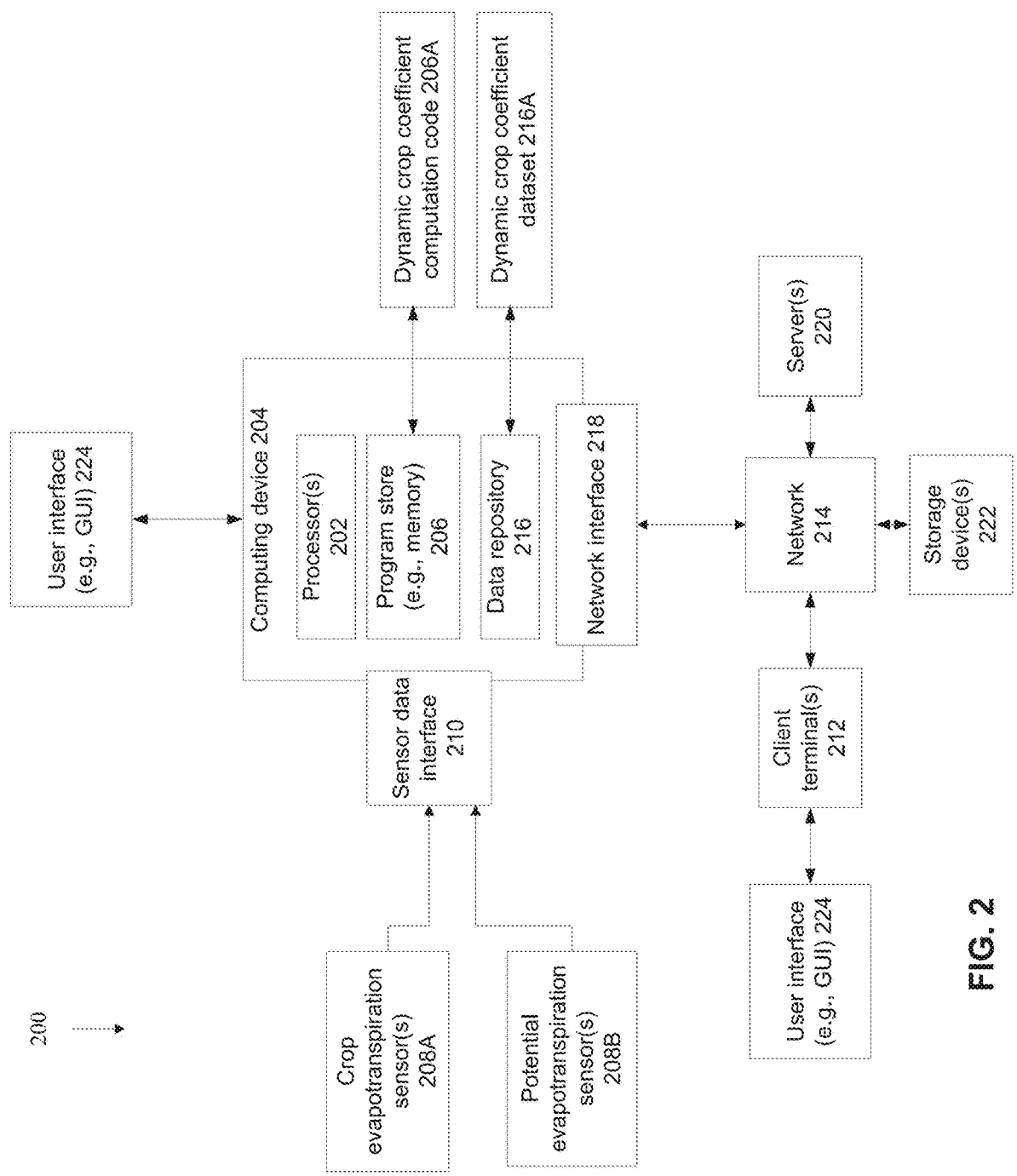
FIG. 2 is a block diagram of components of a system for computing value(s) of a dynamic crop coefficient from data outputted by crop evapotranspiration sensor(s) installed in association with a certain reference crop and storing the computed dynamic crop coefficients in a dataset accessed for planning irrigation events for a target crop, in accordance with some embodiments of the present invention.

Reference is now made to FIG. 1, which is a flowchart of a method of computing value(s) of a dynamic crop coefficient from data outputted by crop evapotranspiration sensor(s) installed in association with a certain reference crop and providing the dynamic crop coefficient for planning irrigation events for a target crop, in accordance with some embodiments of the present invention. Reference is also made to FIG. 2, which is a block diagram of components of a system 200 for computing value(s) of a dynamic crop coefficient from data outputted by crop evapotranspiration sensor(s) installed in association with a certain reference crop and storing the computed dynamic crop coefficients in a dataset accessed for planning irrigation events for the target crop, in accordance with some embodiments of the present invention. System 200 may implement the acts of the method described with reference to FIG. 1, by processor(s) 202 of a computing device 204 executing code instructions stored in a program store 206.

It is noted that acts 102-110 relate to creation of the dataset storing dynamic crop coefficient parameters based on the reference crop growing in the reference field. Acts 112-120 relate to use of the dataset storing dynamic crop coefficient parameters for irrigation of the target crop growing in the target field.

At least some of the systems and/or methods and/or code instructions described herein compute the amount of water (and/or when the amount of water is applied) for irrigating the target crop according to the dynamic crop coefficient, where the target field is not associated with sensors (i.e., crop evapotranspiration and/or potential evapotranspiration sensor) and/or sensors are not installed in the target field. The value(s) of the potential evapotranspiration parameter(s) used to compute the amount of irrigation water in association with the dynamic crop coefficient may be obtained from an external weather station and/or weather data provider (e.g., cloud based server). The amount of irrigation water to apply and/or when the irrigation water is applied may be adjusted according to the correction parameter(s) that corrects for variations between the target field profile of the target field and the field profile of the matched field. The irrigation may be automatically delivered remotely, for example, a valve may be automatically turned on through a mobile application running on a mobile device of a target user.

Computing device 204 receives data based on outputs of crop evapotranspiration sensor(s) 208A and/or potential evapotranspiration sensor(s) 208B. The data may be received from a client terminal and/or server that processes the signals outputted by sensor(s) 208A-B to compute higher level data is used by computing device 204 to compute the values of the crop evapotranspiration parameter and/or the potential evapotranspiration parameter. Alternatively or additionally, computing device 204 receives the computes values of the crop evapotranspiration parameter and/or the potential evapotranspiration parameter which are computed by another client terminal and/or server.

Computing device 204 receives the data based on outputs of crop evapotranspiration sensor(s) 208A and/or potential evapotranspiration sensor(s) 208B via one or more sensor data interfaces 210, for example, a network interface, a wire connection, a wireless connection, other physical interface implementations, and/or virtual interfaces (e.g., software interface, application programming interface (API), software development kit (SDK)).

Computing device 204 may be implemented as, for example, a client terminal, a server, a computing cloud, a mobile device, a desktop computer, a thin client, a Smartphone, a Tablet computer, a laptop computer, a wearable computer, glasses computer, and a watch computer. Computing device 204 may include locally stored software that performs one or more of the acts described with reference to FIG. 1, and/or may act as one or more servers (e.g., network server, web server, a computing cloud) that provides services (e.g., one or more of the acts described with reference to FIG. 1) to one or more client terminals 212 over a network 214, for example, providing software as a service (SaaS) to the client terminal(s) 212, providing an application for local download to the client terminal(s) 212, and/or providing functions via a remote access session to the client terminals 212, such as through a web browser and/or application stored on a Mobile device.

Client terminals 212 accessing computing device 204 may include one or more of: a server, a computing cloud, a mobile device, a desktop computer, a thin client, a Smartphone, a Tablet computer, a laptop computer, a wearable computer, glasses computer, and a watch computer.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include one or more processors (homogenous or heterogeneous), which may be arranged for parallel processing, as clusters and/or as one or more multi core processing units.

Storage device (also known herein as a program store, e.g., a memory) 206 stores code instructions implementable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores dynamic crop coefficient code 206A that executes one or more acts of the method described with reference to FIG. 1.

Computing device 204 may include a data repository 216 for storing data, for example, a dynamic crop coefficient database 216A that stores the computed dynamic crop coefficients per interval of time (e.g., calendar day, degree day) according to one or more of parameters of the field profile. Data repository 216 may be implemented as, for example, a memory, a local hard-drive, a removable storage unit, an optical disk, a storage device, and/or as a remote server and/or computing cloud (e.g., accessed via a network connection).

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may connect via network 214 (or another communication channel, such as through a direct link (e.g., cable, wireless) and/or indirect link (e.g., via an intermediary computing unit such as a server, and/or via a storage device) with one or more of:

- Client terminal(s) 212, for example, when computing device 204 acts as a server providing SaaS and/or providing services for computation of crop evapotranspiration parameters, for example, to farmers growing target crops without crop evapotranspiration sensors installed in the target field of the target crop.
- Remotely located server 220 that provides data from crop evapotranspiration sensors associated with a certain crop, used to compute the dynamic crop coefficient.
- Storage device 222 that stores computed data, sensor data, and/or the dynamic crop coefficient dataset.

Computing device 204 and/or client terminal(s) 212 include and/or are in communication with a user interface 224 that includes a mechanism for a user to enter data (e.g., parameters of the field profile) and/or view presented data (e.g., the dynamic crop coefficient obtained from the database), for example, a graphical user interface (GUI). Exemplary user interfaces 224 include, for example, one or more of, a touchscreen, a display, a keyboard, a mouse, and voice activated software using speakers and microphone. The GUI may be stored as code within data repository 216, memory 206, and/or data storage devices and/or memory associated with client terminal 212.

Referring now back to FIG. 1, at 102, a value of a crop evapotranspiration parameter (ETc) is computed (e.g., by computing device 204, client terminal 212, and/or server 220) from electrical signals outputted by crop evapotranspiration sensor 208A that senses an indication of an actual amount of water consumed by the reference crop.

The crop evapotranspiration parameter is computed for a defined interval of time, which may be variable or set at defined intervals for example, one day, less than one day, three days, less than three days, seven days, less than seven days, ten days, less than ten days, two weeks, or less than two weeks, or other time intervals. When the GBI™ system (and/or another monitoring system) is implemented, the interval of time may be variable, defined according to the pattern of watering by the GBI™ system, which dynamically waters the crops as needed rather based on preset intervals. The defined interval of time may be selected and/or retrieved according to available measurements, and/or according to settings (e.g., in which case the data from available measurements conducted over the interval of time are added together). The defined interval of time may be defined according to irrigation events.

The crop evapotranspiration parameter is computed for a certain growing season of the crop, defined according to the growth of each crop. The growing season is defined for a certain year (e.g., the growing season may span two or more years, or a portion of one year).

The reference crops are grown under controlled conditions, in which irrigation is performed based on a defined plan. Water by nature (e.g. rain, dew) is not necessarily required.

Exemplary reference crops include crop irrigated through pressurized systems, which may include edible plants and/or non-edible plants used for other purposes, for example, mango, medical marijuana, cotton, wheat, apples, and rosemary.

The value of the crop evapotranspiration parameter denotes the actual amount of water consumed by the crop grown under optimal conditions without stress during the certain interval of time.

Optionally, the crop evapotranspiration parameter is computed from output of crop evapotranspiration sensor(s) 208A that measure an indication of the amount of water used to irrigate the crop in a controlled environment. The crop is monitored by a system that measures plant growth and determines the amount of water used to irrigate the crops to avoid stress. The amount of water used to irrigate the crop is statistically equivalent to the actual amount of water consumed by the crop, based on the assumption that the monitoring system is designed to achieve a water balance of crop irrigation without stress.

An example of the monitoring system is Growth Based Irrigation™ (GBI) available from Suplant. GBI™ automatically controls the amount of water to apply to the crop such that stress of the crop is avoided or significantly reduced. GBI™ monitors (continuously or periodically or based on events) data collected from the crop, soil and weather sensors installed in the field, analyzes the data, and sends irrigation commands directly to the valves in the field to deliver the computed irrigation plan. GBI™ uses data from sensors that measure one or more of: crop growth rate (e.g., trunk growth, stem growth, fruit growth), leaf temperature, soil moisture response, and environmental temperature-relatively humidity relationship.

Alternatively or additionally, crop evapotranspiration sensor(s) 208A is implemented as a lysimeter, which is a complex installation that measures the amount of water supplied to the crops and percolated from the root system. Other suitable implementations of crop evapotranspiration sensor(s) 208A may be used.

At 104, a value of a potential evapotranspiration parameter (ETo) is computed for a corresponding defined interval of time from electrical signals outputted by potential evapotranspiration sensor(s) 208B that sense weather conditions. The value of the potential evapotranspiration parameter denotes an exemplary hypothetical grass reference crop with full cover. The exemplary reference surface closely resembles an extensive surface of green, well-watered grass of uniform height, actively growing and completely shading the ground.

The value of the potential evapotranspiration parameter may be obtained from and/or computed based on one or more of the following exemplary sources:

- Data obtained from a weather station (e.g., weather server) measuring and/or storing prevailing weather conditions for the geographical location of the crop. The weather station may be located close to the field where the crops are growing to obtain a more accurate measure of the local weather conditions affecting the crops.
- Computed based on temperature (measured by a temperature sensor), radiation (measured by a radiation sensor), relatively humidity (measured by a relative humidity sensor), and/or wind (measured by a wind sensor). The sensors may be installed close to the field where the crops are growing to obtain a more accurate measure of the local weather conditions affecting the crops.

Obtained from a weather service provider that computes the potential evapotranspiration parameter for different locations based on dispersed weather stations.

At 106, a value of a dynamic crop coefficient (Kcd) is computed for the reference crop growing at the reference field, for the defined interval of time, based on the computed value of the crop evapotranspiration parameter and the computed value of the potential evapotranspiration parameter. The value of the dynamic crop coefficient for the certain interval of time is computed by dividing the value of the crop evapotranspiration parameter by the value of the potential evapotranspiration parameter.

The dynamic crop coefficient may be computed according to the following exemplary equations:

$$ETc = ETo \times Kcd$$

$$Kcd = ETc/ETo$$

Where:

ETc denotes the value of the crop evapotranspiration parameter,

ETo denotes the value of the potential evapotranspiration parameter, and

Kcd denotes the value of the dynamic crop coefficient for the defined interval of time.

Figure 3:
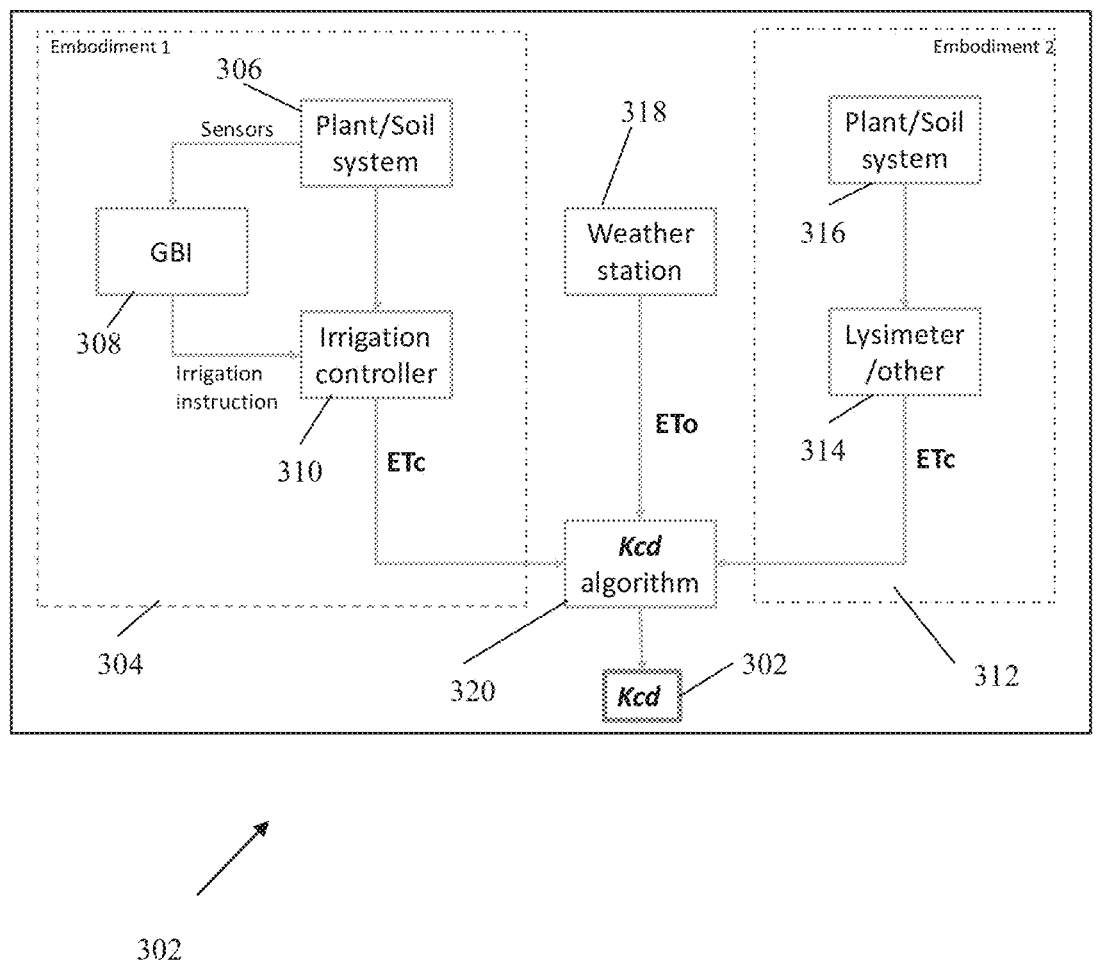
FIG. 3 is a dataflow diagram depicting computation of a dynamic crop coefficient, in accordance with some embodiments of the present invention.

Reference is now made to FIG. 3, which is a dataflow diagram depicting computation of a dynamic crop coefficient (Kcd) 302, in accordance with some embodiments of the present invention. Kcd 302 is computed from a value of the crop evapotranspiration parameter (ETc) and a value of the potential evapotranspiration parameter (ETo), which may be computed based on different methods.

One method denoted by 304 is based on sensors that measure plant and/or soil parameters 306 which are used by a monitoring system (e.g., GBI™) 308 to instruct an irrigation controller 310 with an irrigation plan, as described herein. The amount of water used to irrigation the crops by irrigation controller 310 corresponds to the value of the crop evapotranspiration parameter, based on the assumption that the amount of water used for irrigation as computed by monitoring system 308 is statistically equivalent (e.g., within an error requirement) to the amount of water used by the crops.

Another method denoted by 312 for computing the value of the crop evapotranspiration parameter is based on a lysimeter 314 and/or other sensor that measures parameters of the crop and/or soil 316.

Data outputted by a weather station 318 is used to compute ETo.

Kcd 302 is outputted by Kcd algorithm 320 (e.g., implemented as code instructions stored in a data storage device executable by one or more processors) based on ETo and ETc.

Referring now back to FIG. 1, at 108, the computed value of the dynamic crop coefficient is associated with the certain interval of time of the certain growing season of the reference crop, and optionally with a reference field profile. The reference field profile includes the species and/or variety of the crop. The reference field profile includes several parameters of growing conditions of the reference crop corresponding to the growing conditions where the crop evapotranspiration sensor(s) and/or the potential evapotranspiration sensor(s) perform the sensing used to compute the value of the crop evapotranspiration parameter and/or the value of the potential evapotranspiration parameter.

As used herein, the term field profile sometimes refers to the reference field profile, and sometimes refers to both the reference field profile and the target field profile such as for matching between the reference field profile and the target field profile.

Exemplary parameters of growing conditions included in the reference field profile include one or more of: geographical location, soil type (e.g., texture, depth, organic matter), biomass development (e.g., measurable as leaf area index, remotely sensed normalized difference vegetation index), nutritional condition (e.g., nitrogen condition), and cultural management (e.g., plantation distances, canopy formation, and end-product). The parameters of the reference field profile may be defined, for example, manually by the grower, automatically based on sensor data (e.g., global positioning device of the client terminal of the grower providing the geographical location of the field), and/or retrieved from a data storage device.

Reference is now made to FIG. 10, which includes a list and/or tables of exemplary parameters that may be included within the field profile of the crop(s), in accordance with some embodiments of the present invention. The field profile improves the accuracy of matching a target crop to existing data associated with reference crops, optionally stored in the dataset, by identifying the crop with the field profile that has the closest statistically significant correlation to a target field profile of a target crop. The matching according to the field profile improves relevancy of the stored dynamic crop coefficient to the target crop. The field profile may be used to compute the correction parameter that provides a statistically significant correction of the stored dynamic crop coefficient for the target crop. For example, the field profile may correct for variation in soil types between the soil of the crop associated with the dynamic crop coefficient and the soil type of the target crop.

The parameters of the field profile may be obtained, for example, by manual entry of the grower of the crop, automatically from sensor data, automatically from data stored in publicly accessible databases, and/or retrieved from a data storage device.

The following exemplary parameters of the field profile are described with reference to FIG. 10. The exemplary parameters may be stored within the reference field profile of the reference crop and/or within the target field profile of the target crop:

Company: denoting the name of the company that owns the crop and/or manages irrigation of the crop.

Field name: denoting the name of the field where the crop is growing.

Plot ID: denoting the identification of the field where the crop is growing, for example, defined by a land registry.

Location & coordinates: denoting geographical location of the field where the crop is growing, for example, city, street, geographical coordinates (e.g., latitude, longitude).

Elevation: denoting the elevation above sea level of the field.

Slope and Slope exposure: denoting the angle of the field.

Field type: denoting whether the data is being provided based on sensor measurements associated with the field, or whether the crop is a target crop for which the dynamic crop coefficient is requested.

Greenhouse/open field/orchard/other: denoting whether the field is open, a green house, an orchard, or something else.

Crop species and/or variety: denoting the species and/or variety of the crop.

Planting date: denoting the date of planting of the crop, may be used to define the growing season.

Agricultural produce purpose: denoting the end product of the crop, for example wine, fresh fruit, and industrial processing.

Spatial density: denoting the distance between and/or along rows and/or plants, optionally measured in density per square meter.

Planting system: denoting the method for planting the crops, for example, trellis, tree training, and pruning.

Yield nominal load (i.e. High, medium, low): an estimate of the amount of stress experienced by the field.

Soil physical description: denoting physical parameters of the soil, for example, horizontal number and depth, texture and separate percentage, stone percentage, and compaction.

Soil chemical description: denoting chemical parameters of the soil, for example, pH, salinity (EC), and carbonates. Optionally a range of value is provided.

Irrigation method: denoting the method of irrigating the crop, for example, drip, sprinkler, pivot, furrow, and flood.

Irrigation flow rate: denoting the irrigation flow rate for pressurized system, for example, low/high/emitter.

Canopy condition: denoting parameters of the canopy, for example, biomass (e.g., leaf area index (LAI), vegetation fraction) optionally measured in grams per square meter, nutritional condition, and sanitary condition (e.g., pests, weeds).

The association of the computed value of the dynamic crop coefficient may be implemented, for example, as a database, as metadata associated with the value of the dynamic crop coefficient, as pointers and/or a mapping structure that points from a data structure storing the value of the dynamic crop coefficient to data structures storing values of the interval of time, the growing season, and the field profile.

Optionally, the computed dynamic crop coefficient is stored in dynamic crop coefficient dataset 216A, optionally a database, optionally a table. Dataset 216A may be arranged to include the following fields: interval of time, growing season, and one or more parameters of the field profile. For example, data of the mango field described in the Examples section below may be stored in the dataset as follows. Dataset 216A stores, for different crops having different field profiles (e.g., each client terminal provides data for a certain crop having a certain field profile), the dynamic crop coefficient is computed for each day of the growing season.

It is noted that discrete values of the dynamic crop coefficient may be stored, and/or a function may be computed that represents a set of values of the dynamic crop coefficient over multiple time intervals.

When the interval of time is additionally or alternatively measured in degree days, dynamic crop coefficient dataset 216A stores values of dynamic crop coefficients according to degree days in addition to or alternatively to the calendar days. The computed dynamic crop coefficients associated with degree days may be used to plan irrigation events for the target field (i.e., the field other than the field for which measurements were performed to compute the dynamic crop coefficient), in a subsequent time frame growing season (e.g., the following year) according to the degree days rather than calendar days, since degree days represent a more accurate picture of the growing season than calendar days. The subsequent time frame may include a subsequent growing season (e.g., the following year), and/or a time interval between when seeds of the target field were sown in comparison to seeds of the reference field. For example, the target field was sown 3 weeks after the seeds of the reference field were sown. The certain time interval of the reference field is on a different calendar day than the target time interval of the target field, for example, at least 1 week, 2 weeks, 3 weeks, 1 month, 2 months, 3 months earlier, or other values. The computation method used to compute the degree days may vary according to the field profile, for example, based on the average between the maximum and minimum temperatures per days, according to a baseline of 10 degrees (or other temperature e.g., below which the species of crop does not grow).

At 110, blocks 102-108 are iterated to compute multiple values of the dynamic crop coefficient values over multiple intervals of time during the certain growing season. For example, values of the dynamic crop coefficient may be computed daily or weekly, or other intervals of time, to obtain a set of values that may be used to plan irrigation for the target crop over a full growing season. The dynamic crop coefficient values may be computed over multiple growing seasons. The dynamic crop coefficient parameter computed over multiple growing seasons improves the robustness of the dynamic crop coefficient parameter, for example, accounting for variations that occur over the multiple growing seasons.

Optionally, values of the dynamic crop coefficient are computed per day (or other defined time interval) according to a moving average (or other smoothing function) of a window size for an interval of time of seven days. Other window sizes may be used for computation of the moving average, for example, 3 days, 10 days, 14 days, or other values. The moving average smoothes extreme values in the dynamic crop coefficient that would otherwise appear when short time intervals are used (e.g., daily values without averaging), for example, as discussed with additional detail in the Examples section below.

The dynamic crop coefficient computed according to the moving average (or other smoothing function) provides crop growers with data that is used to program irrigation plans for relatively longer time intervals (e.g., weekly), for example, rather than adapting the irrigation plan according to shorter time intervals (e.g., daily). It is noted that irrigation plans may be adapted daily, for example, according to preference of the crop grower.

An example of a method of computing the dynamic crop coefficient according to the moving average is now described. It is noted that the parameters serve as non-limiting examples, as other values may be used.

Compute the average hourly value of the potential evapotranspiration parameter from data outputted by potential evapotranspiration sensor(s).

Compute the daily potential evapotranspiration parameter value by summing the hourly values of the potential evapotranspiration parameter.

Compute the daily crop evapotranspiration parameter value by summing the amount of water used in the irrigation events of each day to irrigate a field that is monitored by a monitoring/control system that measures crop growth and computes the amount of water for irrigate the crops to avoid stress.

Compute, for each day of the growing season, the daily dynamic crop coefficient (denoted $Kcd_i$) according to a 7 day moving average, according to the following equation:

$$Kcd_i = \sum_{j=i}^{i-7} ETc_i \bigg/ \sum_{j=i}^{i-7} ETo_i$$

At 112, one or more values of the dynamic crop coefficient (which was computed for the reference crop growing in the reference field) are obtained for a target crop, optionally from dataset 216A that stores crop coefficients. The dynamic crop coefficient is obtained according to a corresponding target time interval within the target growing season of the target crop. The target time interval within the target growing season of the target crop may be received, for example, from the client terminal via the GUI described herein. Alternatively or additionally, the dynamic crop coefficient is obtained according to a degree day corresponding to the degree day corresponding to the target time interval, as described herein.

A field profile of the target crop may be received, for example, from the client terminal. The target field profile may be manually entered by a user (e.g., using a graphical user interface (GUI) presented on the display of the client terminal, for example, a smartphone running a mobile application), automatically created (e.g., by code that accesses databases storing data of the target crop), and/or retrieved from a storage device (e.g., stored for repeat clients). An exemplary target field profile is discussed with reference to FIG. 10.

The target field profile is matched to a certain field profile stored in dataset 216. The matching may be performed according to a requirement, for example, a statistical distance, a set-of-rules, a direct match between field(s) of the profiles, and/or a correlation requirement.

The value(s) of the dynamic crop coefficient(s) may be retrieved from the matched certain field profile. The value(s) of the dynamic crop coefficient may be retrieved according to the time interval of the crop that corresponds to the received target time interval of the target crop.

Irrigation for the target crop is planned based on the dynamic crop coefficient(s) obtained from dataset 216A, optionally having the target field profile, growing in the target field, without data outputted by crop evapotranspiration sensors installed in association with the target field. It is noted that the value of the potential evapotranspiration parameter is used in the computation of the irrigation for the target crop. The irrigation for the target crop may be planned via the GUI described herein.

The dynamic crop coefficient dataset 216A is accessed to obtain computed dynamic crop coefficient values which are processed to provide amount of irrigation water needed to a grower (e.g., using a client terminal) that is not associated with the crop evapotranspiration sensor that provided measurements used to compute the dynamic crop coefficients stored in dataset 216A. For example, dataset 216A stores dynamic crop coefficients computed based on data outputted by sensors from a mango field located in one location (e.g., within one state), and a client terminal associated with a target mango field in another location (e.g., within a different state) is used to access dataset 216A to retrieve the dynamic crop coefficients computed based on data outputted by sensors from the first mango field.

The dynamic crop coefficients may be retrieved during a subsequent growing season, based on corresponding time intervals, optionally degree days. For example, the client terminal accesses dataset 216A to retrieve dynamic crop coefficients which were computed for the mango growing season two or more years ago, optionally computed over multiple growing seasons. The two or greater number of years old data, optionally based on degree days, is used to plan the current year's irrigation for the target field.

Optionally, the computed dynamic crop coefficients are retrieved for a target field that is sown after the reference field, with a time interval of, for example, at least 3 days, at least 1 week, at least 2 weeks at least 3 weeks, at least 1 month, at least 1.5 months, at least 2 months, at least 3 months, at least 1 year, or other time intervals. The dynamic crop coefficient may be matched to the target field according to degree days rather than calendar days. For example, when the target field crops are at 100 degree days, the dynamic crop coefficient corresponding to 100 degree days of the reference field is obtained. The 100 degree days of the reference field may have occurred a while in the past, for example, 1 month, 3 months, or a year.

Optionally, the computed dynamic crop coefficient(s) are adjusted for planning the irrigation of the target crop. The adjustment is performed according to a computed correction parameter (e.g., index) that corrects for statistical variations between the target field profile of the target crop and the field profile associated with the computed dynamic crop coefficient stored in the dataset. For example, the correction parameter corrects for variations in the soil composition between the target field of the target crop and the field of the crop having values stored in the dataset. The correction parameter may be computed according to a statistical correlation between the field profile of the target crop and the field profile of the dynamic crop coefficient stored in the dataset. The statistical correlation may be analyzed to increase or decrease the amount of water to be applied to the target field.

At 114, irrigation of a target crop is planned according to the retrieved dynamic crop coefficients and the value(s) of the local potential evapotranspiration parameter. The irrigation is planned based on the crop evapotranspiration parameter, computed for the target crop, based on the retrieved dynamic crop coefficients and the local potential evapotranspiration. The irrigation may be planned for the target crop growing with a statistically significant difference (e.g., according to a requirement) between the target field profile and the field profile of the crop associated with the retrieved dynamic crop coefficients.

Optionally, the planning of the irrigation of the target crop according to the dynamic crop coefficient is performed via the GUI presented on a display of the client terminal and/or computing device, optionally of the mobile device. The value(s) of the local potential evapotranspiration parameter may be manually entered by the user via the GUI, and/or automatically computed based on data transmitted by the sensor(s). Alternatively or additionally, the planning of the irrigation of the target crop according to the dynamic crop coefficient is automatically performed based on code instructions stored in a data storage device executed by one or more hardware processors. The amount of water to apply to the target crop is denoted by the value of the crop evapotranspiration parameter, which is computed using the obtained dynamic crop coefficients and a value(s) of the potential evapotranspiration parameter computed for the target crop. The value(s) of the potential evapotranspiration parameter may be computed based on potential evapotranspiration sensor data corresponding to the location of the target crop, for example, a weather server storing and/or measuring prevailing weather conditions for the geographical location of the target crop.

The computed dynamic crop coefficient is used to compute irrigation for the target crop, without output of a crop evapotranspiration sensor sensing the actual amount of water consumed by the target crop.

At 116, instructions for implementation of the irrigation plan may be automatically computed. For example, which dates and/or which times the field is irrigation, the amount of water to irrigate the field, and/or the method of irrigation (e.g., drip sprinkler). The instructions may include code instructions transmitted to an automated irrigation system for implementation, for example, provided to a controller of the automated irrigation system. Alternatively or additionally, the instructions may include human readable instructions for presentation on a display, optionally within the GUI, for manual implementation by the user. For example, a user without an automated irrigation system may manually activate the irrigation system to apply the irrigation plan according to the instructions.

At 118, the target crop is monitored at one or more time intervals during implementation of the irrigation plan based on the irrigation instructions. The monitoring may be performed automatically, based on images, of the field, for example, images captured by a satellite, images captured by a surveillance aircraft, and/or images captured by stationary image sensors (e.g., located on high poles in proximity to the target field). The image-based monitoring may be used to monitor target fields that are not monitored by plant sensors.

The monitoring may be performed to compute a health status of the target crop based on an analysis of images, optionally satellite images, captured of the target field. An alert may be generated (e.g., within the GUI, transmitted for presentation on a display of the client terminal, a phone call) when the health status falls below a threshold.

The monitoring may be performed via the GUI, for example, the user may view the monitoring images on the GUI.

The target crop during the one or more monitoring time intervals may be analyzed to determine the health status of the crops, for example, whether the crops are growing as predicted and/or are growing according to a defined baseline. The analysis may be automatically performed by an application (e.g., code stored in a data storage device executable by one or more hardware processors) that analyses the satellite images, for example, a "Crop Health Status Validation Tool". The analysis may be manually performed by a user that manually (e.g., visually) analyzes the satellite images.

The analysis may be performed according to a defined baseline, for example, a defined minimal acceptable health condition of the crops. Multiple defined health conditions of the crops may be defined, for example, unacceptable health, minimally acceptable, satisfactory, and desired level. Regions of the field, or the entire field, which fall below the baseline may be indicated. For example, the satellite images (or other map of the field) may be automatically marked, optionally using distinct colors, to indicate the regions of the field where the crops are not growing according to the defined minimal acceptable health condition and/or where crops meet different defined levels. The marked maps may be presented within a GUI, stored in a data storage device, and/or transmitted to another server for further analysis.

The application that automatically analyses the images of the crops of the target field serves as a safety belt for the growers of the crops, for monitoring growth of crops of the fields that are planned according to the dynamic crop coefficient.

The application that automatically analyses the images of the crops of the target field may include one or more of the following features which may be defined manually by the user, optionally via the GUI, and/or automatically optionally based on data entered by the user via the GUI:

Definition of the target field's boundaries, manually and/or automatically, for example, via a GUI, for example, a web-based geospatial platform. The boundaries may be manually delineated by a user via the GUI, and/or may be automatically determined, for example, from other maps that delineate property lines, an analysis of the images to determine crop types, and/or an analysis of government databases that delineate legal property boundaries.

Retrieval of the image, for example, accessing a database storing satellite images to obtain the relevant satellite image. The satellite images may be obtained by automatically generated queries transmitted to the database.

Image (e.g., satellite image) pre-processing, which may include Computation of a field health status index for the target field based on the images (e.g., satellite image), and marking the satellite image according to the value of the field health status index. For example, a color coding of the satellite image, where each color represents a certain range of values of the field health status index.

Storing the processed images for viewing by a user. For example, transmitting the processed images to the web-based geospatial platform for presentation within the GUI.

Performing the analysis of the images, for example, to determine whether the crops are growing as desired, as described herein.

Generating an alert for the end user and/or for the dynamic crop coefficient system when the crops are not growing as desired. For example, transmitting an email, a pop-up message, a phone call, and/or a message within the GUI to the mobile device of the user, to a server, client terminal, and/or other devices.

The user may adjust the irrigation plan according to the alert, optionally via the GUI, and/or the user may investigate other causes of the alert.

Figure 11:
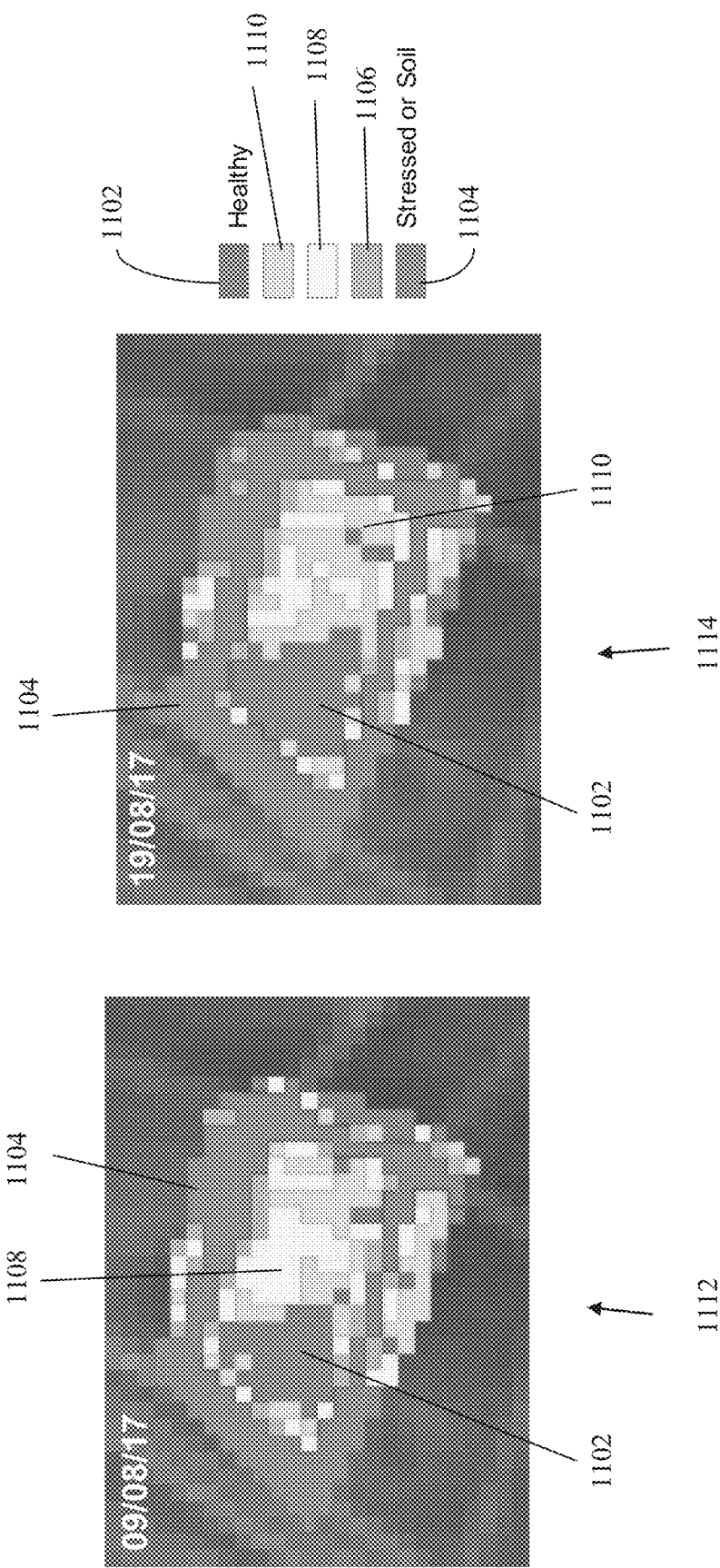
FIG. 11 includes examples of processed satellite images that are automatically processed to indicate health status of the crops, in accordance with some embodiments of the present invention.

Reference is now made to FIG. 11, which includes examples of processed satellite images that are automatically processed to indicate health status of the crops, in accordance with some embodiments of the present invention. A scale, optionally a color coded scale, defines health status of the crops, for example, 1102 denotes healthy crops, 1104 denotes stress crops and/or soil, and 1106, 1108, and 1110 denote values indicating various ranges between health and stressed. Regions of the fields depicted in satellite images 1112 and 1114 are color coded according to the scale.

Images 1112 and 1114 have been respectively captured by the Sentinel-2 Satellite on Aug. 9, 2017, and Aug. 19, 2017. Images are shown with a 10 meter spatial resolution.

At 120, blocks 112-118 are iterated over multiple time intervals (and/or degree days), optionally over the growing seasons, for example, per day (i.e., calendar and/or degree day), twice a week, once a week, or other time intervals. The iterations dynamically adjusts the irrigation plan according to dynamic values of the dynamic crop coefficient parameter corresponding to different time intervals (i.e., calendar and/or degree days) and/or according to dynamic changes in the potential evapotranspiration parameter(s) of the target field.

Various implementations of at least some of the systems and/or methods (e.g., code instructions stored in a data storage device executed by one or more processors delineated hereinabove and as claimed in the claims section below find experimental support in the following examples.

EXAMPLES

Reference is now made to the following examples, which together with the above descriptions illustrate some implementations of the systems and/or methods and/or code instructions stored in a data storage device executed by one or more processors described herein in a non-limiting fashion.

Inventors performed measurements in a mango field located in the northern part of Israel. The mango field was irrigated during the year 2016 according to GBI™ technology installed in association with the mango field.

Reference is now made to FIG. 4, which is a table of a sample of raw potential evapotranspiration values computed on the day of Jun. 14, 2016, based on measurements performed by potential evapotranspiration sensors of a weather station located within the mango field, for computing the dynamic crop coefficient, in accordance with some embodiments of the present invention. Data was collected every 15 minutes (i.e., interval of time). As shown, data was collected from 4:45 AM to 18:45 PM.

Figure 5:
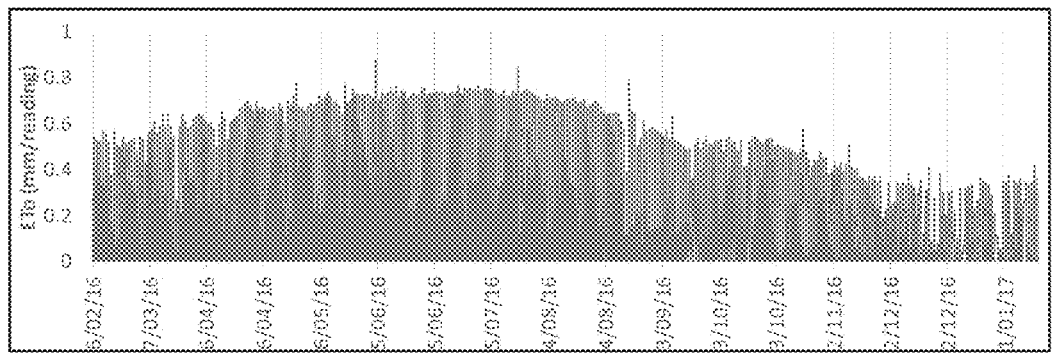
FIG. 5 is a graph of the raw potential evapotranspiration values computed for the growing season from Feb. 2, 2016 and several weeks after Jan. 1, 2017, in accordance with some embodiments of the present invention.

Reference is now made to FIG. 5, which is a graph of the raw potential evapotranspiration values computed for the growing season starting Feb. 2, 2016 and ending several weeks after Jan. 1, 2017, in accordance with some embodiments of the present invention. Four readings were performed per hour, as discussed with reference to FIG. 4. The raw potential evapotranspiration values are computed based on measurements performed by the potential evapotranspiration sensors of the weather station located within the mango field. It is noted that the value of the potential evapotranspiration parameter relatively increases during the summer and relatively decreases during the winter. The data is noisy, with multiple high and low artifacts.

Figure 6:
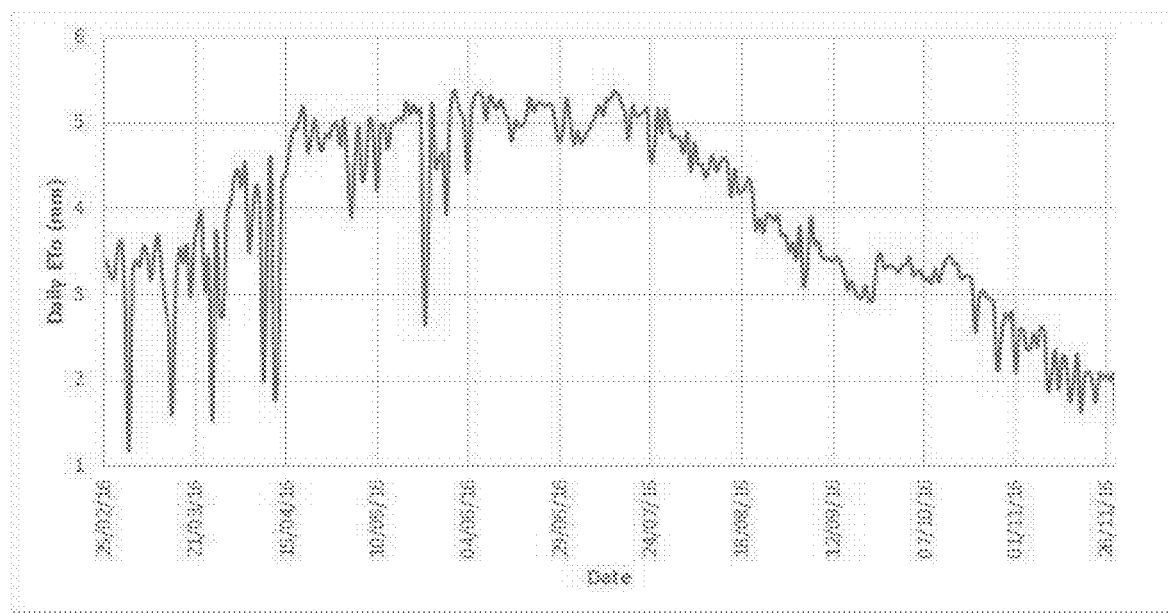
FIG. 6 is a graph of daily crop evapotranspiration parameter values computed by integrating the measurements performed by the potential evapotranspiration sensors of the weather station located within the reference mango field, which are taken every fifteen minutes, in accordance with some embodiments of the present invention.

Reference is now made to FIG. 6, which is a graph of daily potential evapotranspiration parameter values computed by integrating the measurements performed by the potential evapotranspiration sensors of the weather station located within the mango field, which were obtained every fifteen minutes (as discussed with reference to FIG. 4), in accordance with some embodiments of the present invention. The graph depicts values for the growing season from Feb. 25, 2016 to Nov. 26, 2016. It is noted that in terms of climatological and operational factors, four measurements per hour are not necessarily required. A daily value may be more practical in terms of irrigation planning. The data is still noisy, mainly due to variable cloud conditions.

Figure 7:
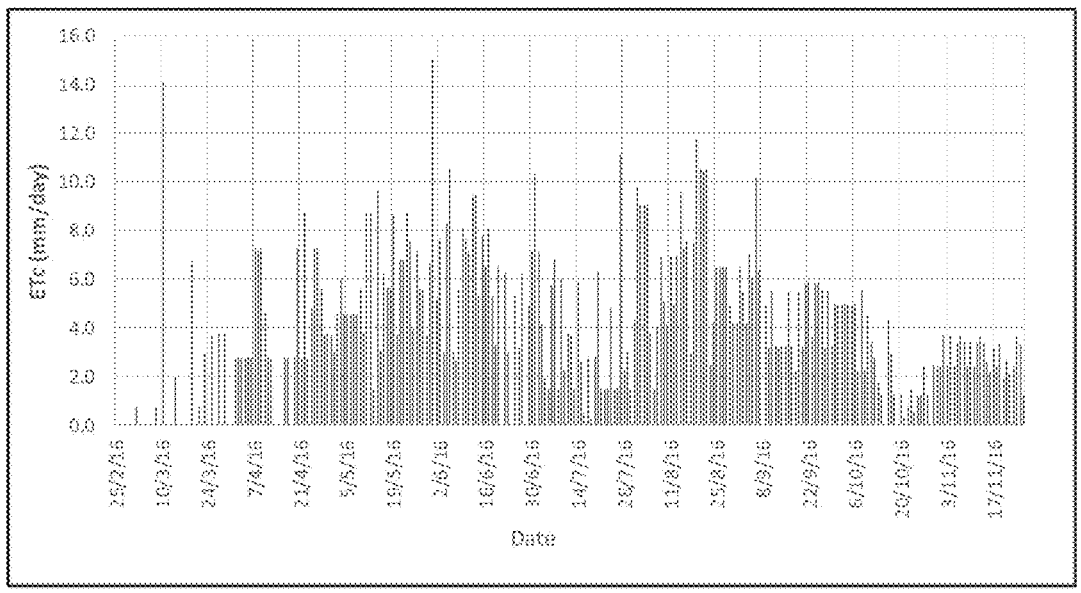
FIG. 7 is a graph of daily values of a crop evapotranspiration parameter for the reference mango field for the growing season from Feb. 25, 2016 to Nov. 17, 2016, in accordance with some embodiments of the present invention.

Reference is now made to FIG. 7, which is a graph of daily values of a crop evapotranspiration parameter for the mango field for the growing season from Feb. 25, 2016 to Nov. 17, 2016, in accordance with some embodiments of the present invention. The crop evapotranspiration parameters are computed based on measurements of a crop evapotranspiration sensor implemented as a sensor that senses the amount of water applied to the mango field based on GBI instructions, which is statistically equivalent to the amount of water that the mango field is using, as discussed herein. Effectively, the graph of FIG. 7 denotes the amount of water used per day to irrigate the mango field. It is noted that irrigation events controlled by the GBI system may occur one or more times a day, or with an interval of several days without irrigation, since GBI activation is based on the climatic conditions. As such, the graph of FIG. 7 includes some days with relatively high values of the crop evapotranspiration parameter (i.e., relatively large amount of water used for irrigation) and other days have a value of zero for the crop evapotranspiration parameter (i.e., no irrigation). The data is highly noisy, and does not necessarily statistically significantly correlate with the fluctuations of the crop evapotranspiration parameter.

Figure 8:
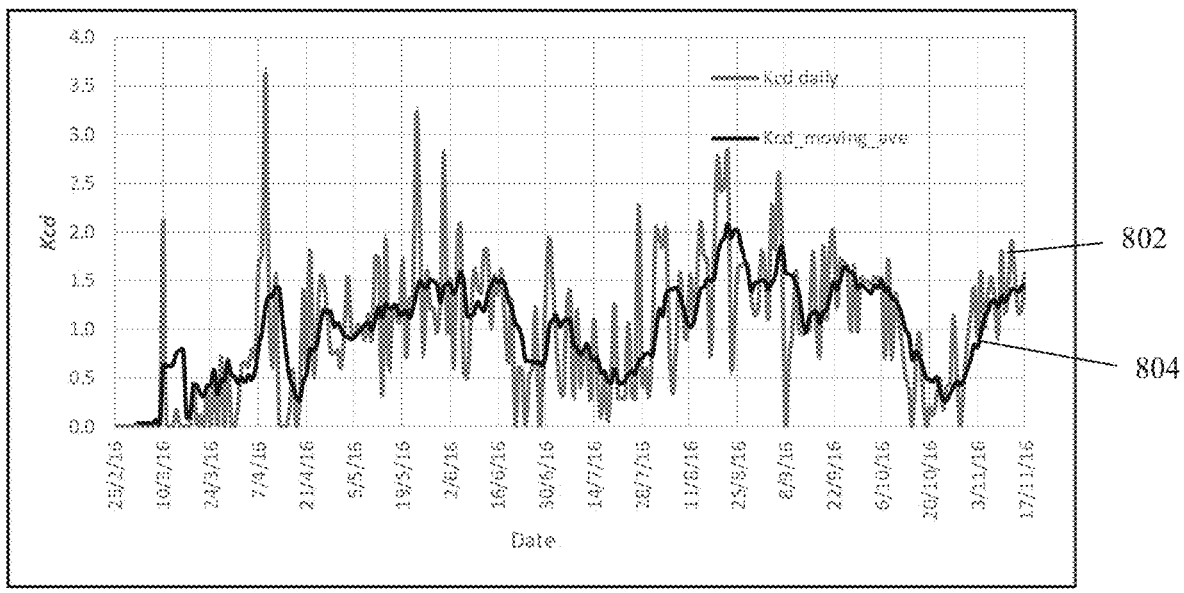
FIG. 8 is a graph depicting the dynamic crop coefficient computed from the crop evapotranspiration parameters and the potential evapotranspiration parameters determined for the reference mango field, computed per day and computed based on a moving average window of seven days, in accordance with some embodiments of the present invention.

Reference is now made to FIG. 8, which is a graph depicting the dynamic crop coefficient computed according to the crop evapotranspiration parameters and the potential evapotranspiration parameters determined for the mango field, computed per day (plotted on curve 802) and computed according to a moving average window of seven days (plotted on curve 804), in accordance with some embodiments of the present invention. As depicted, the averaged dynamic curve 804 generates a more organic result than the daily computation curve 802. The grower of a target mango field may use curve 804 to dynamically adjust the irrigation plan accordingly, for example, daily, weekly, or at other time intervals.

Figure 9:
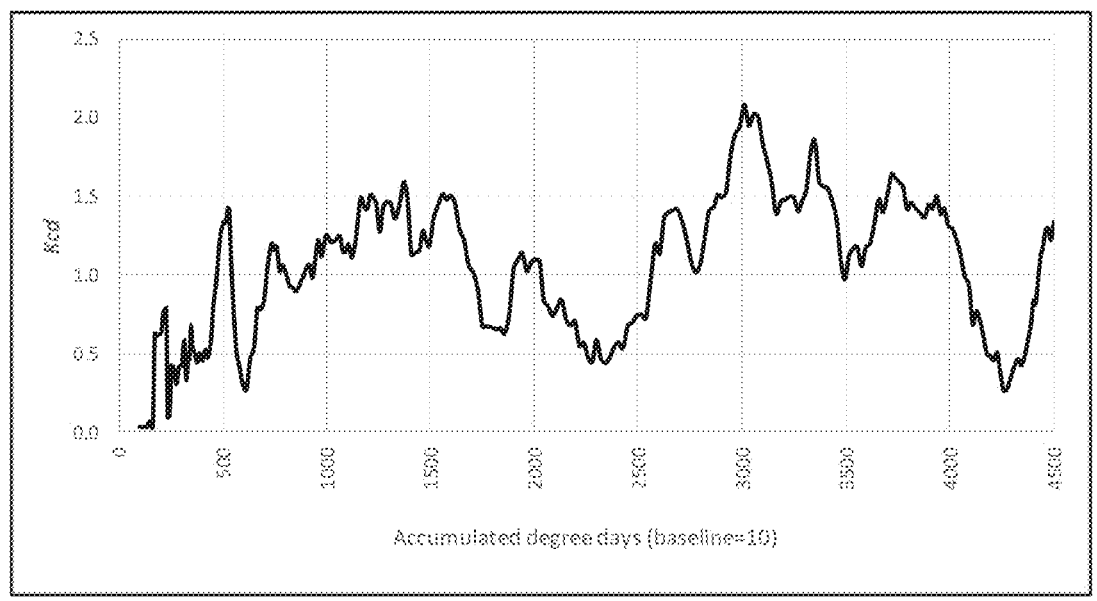
FIG. 9 is a graph of the computed dynamic crop coefficient based on degree days, in accordance with some embodiments of the present invention.

Reference is now made to FIG. 9, which is a graph of the computed dynamic crop coefficient based on degree days, in accordance with some embodiments of the present invention. It is noted that the data plotted in the graph of FIG. 9 is the same data plotted in the graph of FIG. 8 based on calendar days. The degree days are computed according to an average of the maximum and minimum temperatures per day, based on a baseline of 10 degrees.

It is noted that the moving average curve 804 of FIG. 8 and the curve graphed in FIG. 9 depict a similar pattern (and may be statistically significantly correlated) with some subtle differences in the slope and length of each stage of the graph of FIG. 9 in comparison to the curve 804 of FIG. 8.

Inventors performed a second experiment during the middle of 2017 to evaluate some implementations of the systems, methods, and/or code instructions described herein. A field of Clementine trees located in Israel was irrigated according to dynamic crop coefficients computed based on a similar neighboring reference plot that is monitored and controlled by the GBI™ system described herein.

Figure 12:
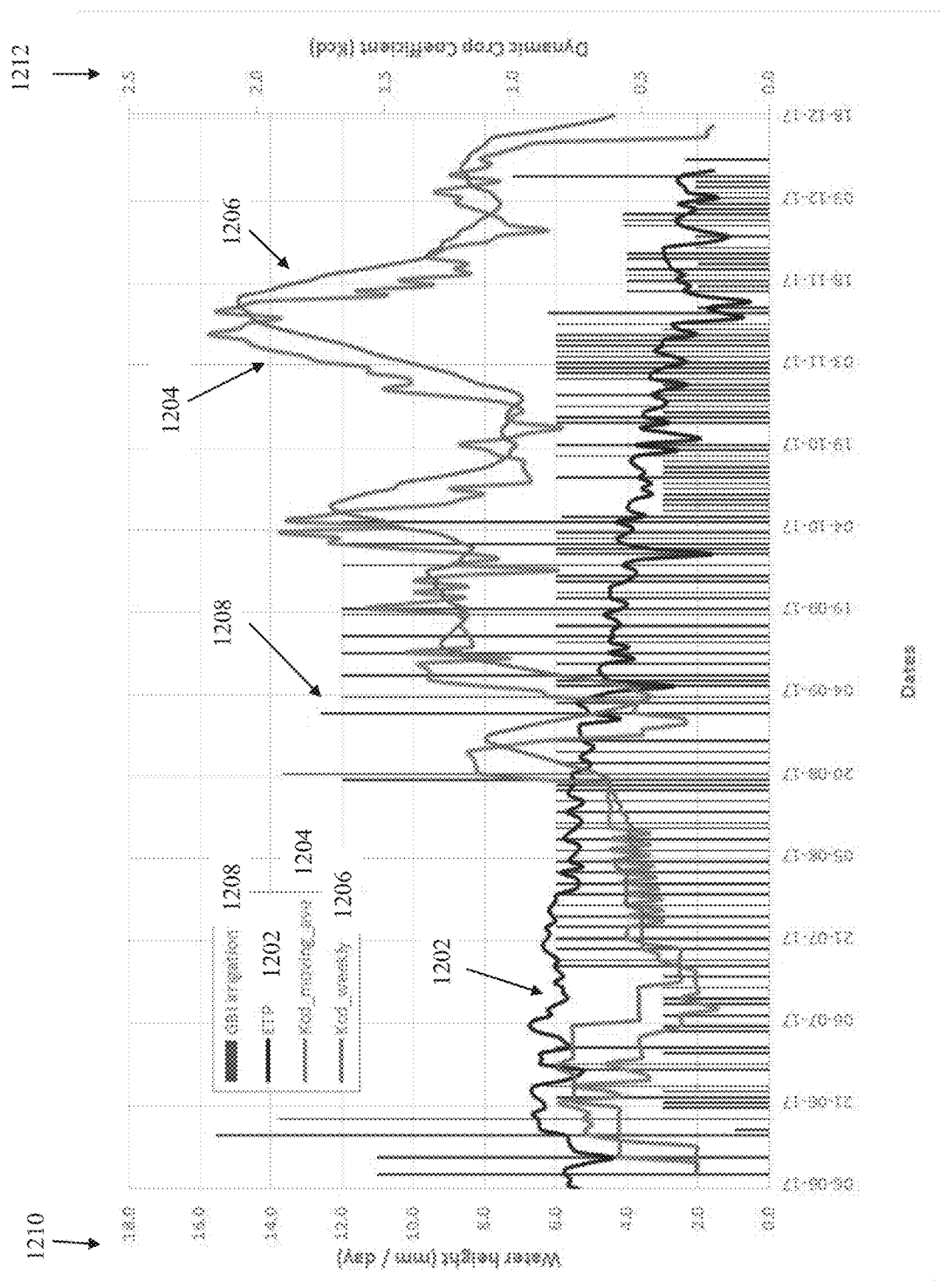
FIG. 12 is a graph depicting values of parameters computed as part of the experiment, in accordance with some embodiments of the present invention

Reference is now made to FIG. 12, which is a graph depicting values of parameters computed as part of the experiment, in accordance with some embodiments of the present invention. The graph includes plots of experimental values of a potential evapotranspiration parameter 1202 (denoted ETP) computed for the Clementine fields, a computed dynamic crop coefficient (denoted Kcd) computed as a moving average 1204 and computed once per week 1206 according to measurements performed at the reference plot (as described herein), and amount of water applied by the GBI™ 1208 computed according to the dynamic crop coefficient and ETP, as described herein. Applied water is measured as water height in terms of millimeters per day, plotted relative to the left axis y-axis 1210. The curves 1204-1206 of the dynamic crop coefficients are plotted against the right y-axis 1212. The values are plotted as a function of time until the date at which the grower stopped to irrigate the Clementine plots.

As depicted by the graph of FIG. 12, the dynamic crop coefficient fluctuated within the range of about 0.4-1.0 during the summer months, while increasing to about 2.0 during around the beginning of October and around mid-November. The pattern of the dynamic crop coefficient indicates that the actual water demand was above what has been generally suggested (i.e., common practice) for Clementine crops towards the beginning of fruit growth. It is noted that there are larger discrepancies about the Kc value for Clementines. For example, Castel, J. R. (1994). *Irriga-* tion amount & dripper number in Clementine. *Journal of Horticultural Science* 69. 10.1080/14620316.1994.11516479 report a Kc of a relatively constant value of 0.5 for most of the season, while Rana, G & Nader, Katerji & De Lorenzi, Francesca. (2005). *Measurement and modelling of evapotranspiration of irrigated citrus orchard under Mediterranean conditions. Agricultural and Forest Meteorology.* 128. 199-209. 10.1016/j.agrformet.2004.11.001 state that the Kc fluctuates from 0.8 to 1.2.

The results of the experiment performed by the inventors provides evidence that the data collected from a reference field irrigated under optimal conditions (i.e., the reference field irrigated with the GBI™ system may be applied to the target plot.

It is noted that for experimental purposes, in order to monitor growth of the tree and/or fruit at the target field for comparison with the reference field, soil and trunk sensors were installed in the target field. As described herein, installation of such soil and trunk sensors are not required in the target field when the dynamic crop coefficient is obtained for the reference field.

Figure 13:
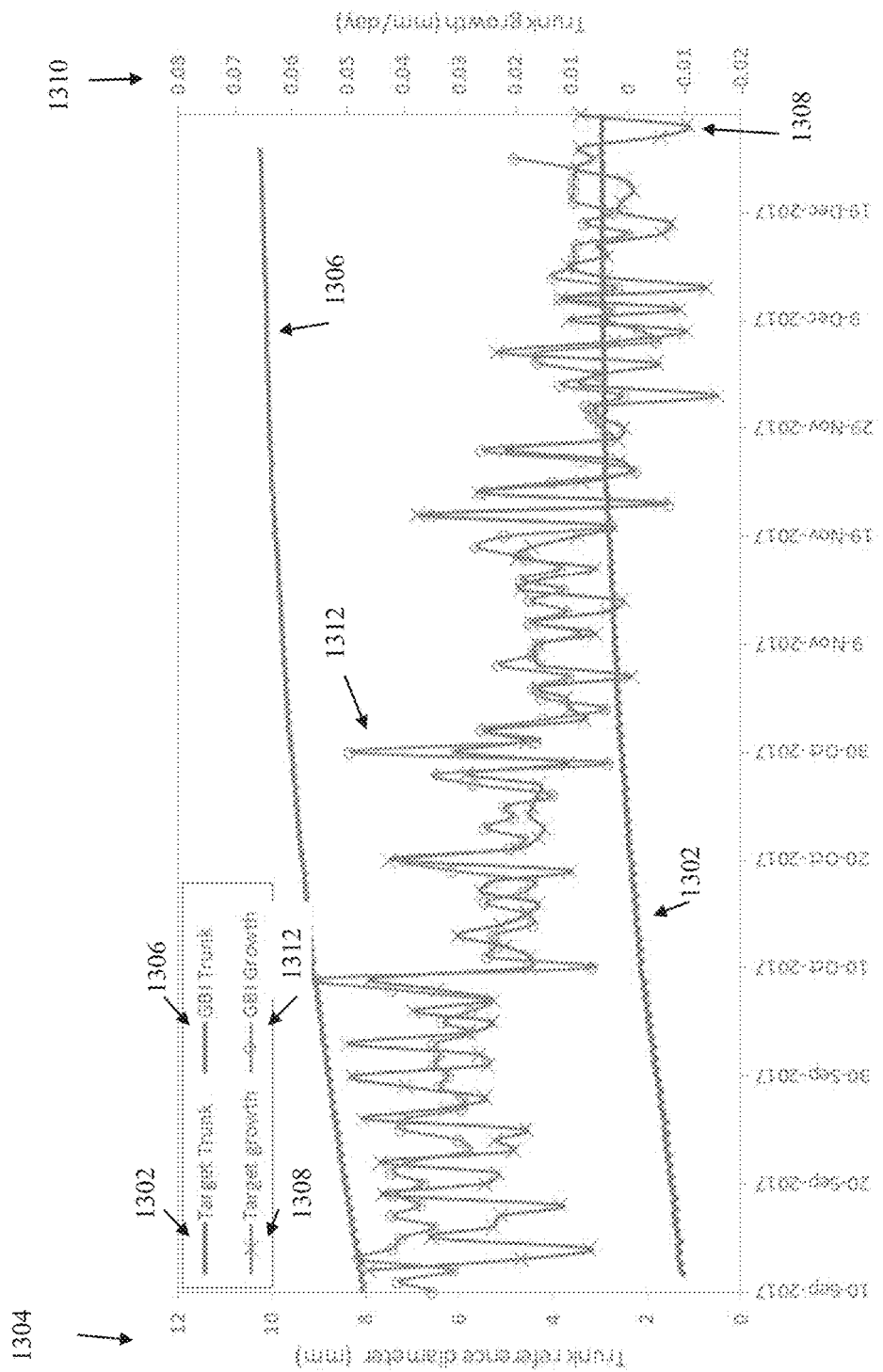
FIG. 13 is a graph depicting the target trunk and trunk growth for the target field and the GBI (i.e., reference) field, in accordance with some embodiments of the present invention.

Reference is now made to FIG. 13, which is a graph depicting the target trunk and trunk growth for the target field and the GBI (i.e., reference) field, in accordance with some embodiments of the present invention. Curve 1302 depicts the diameter of the target trunk in millimeters, plotted on the left y-axis 1304 as a function of time. Curve 1306 depicts the diameter of the GBI (i.e., reference) trunk. Curve 1308 depicts the target trunk growth rate in millimeters per day, plotted on the right y-axis 1310 as a function of time. Curve 1312 depicts the GBI (i.e., reference) trunk growth rate.

Figure 14:
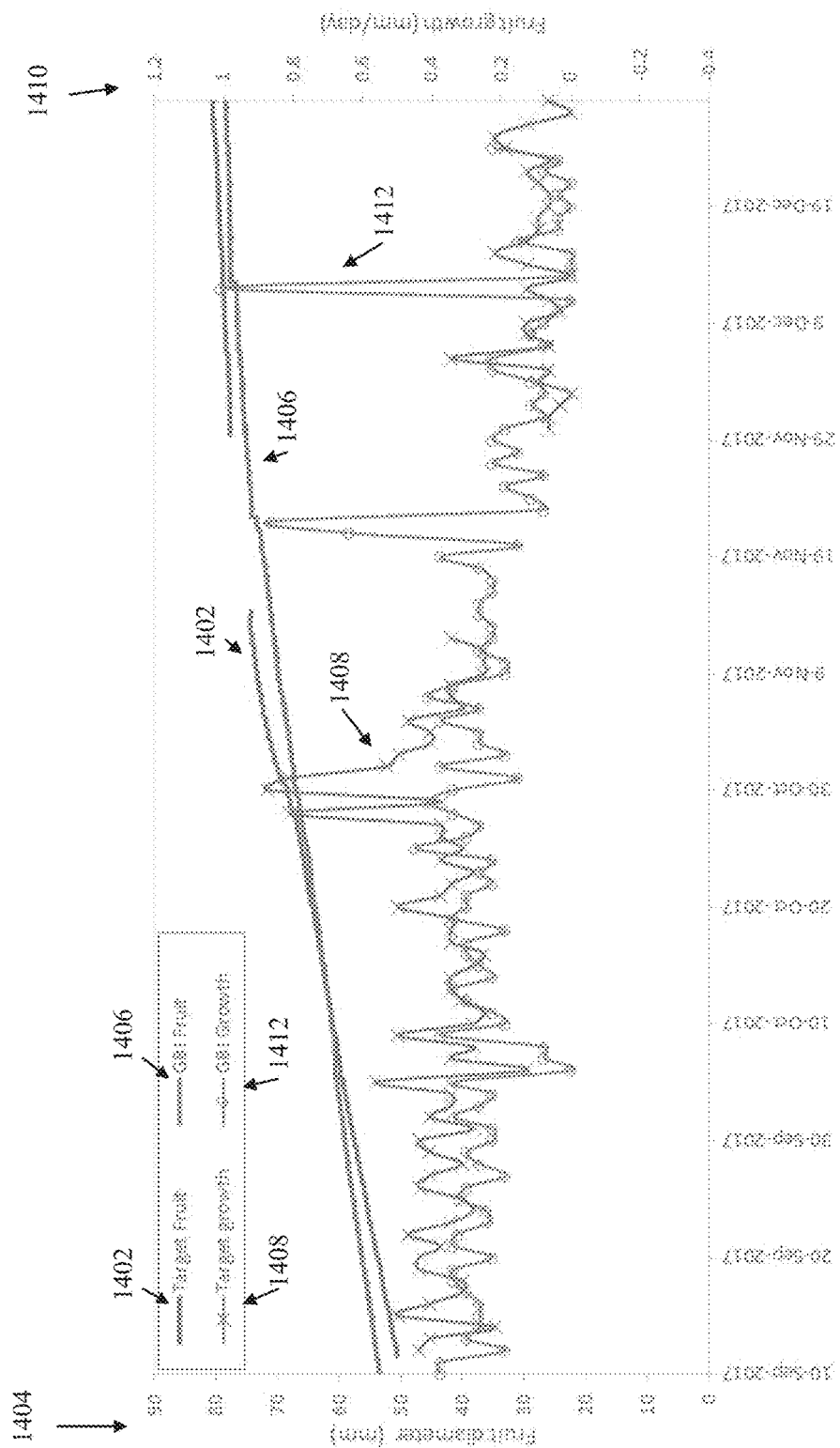
FIG. 14 is a graph depicting the target fruit size and fruit growth for the target field and the GBI (i.e., reference) field, in accordance with some embodiments of the present invention.

Reference is now made to FIG. 14, which is a graph depicting the target fruit size and fruit growth for the target field and the GBI (i.e., reference) field, in accordance with some embodiments of the present invention. Curve 1402 depicts the diameter of the target fruit in millimeters, plotted on the left y-axis 1404 as a function of time. Curve 1406 depicts the diameter of the GBI (i.e., reference) fruit. Curve 1408 depicts the target fruit growth rate in millimeters per day, plotted on the right y-axis 1410 as a function of time. Curve 1412 depicts the GBI (i.e., reference) fruit growth rate.

It is noted that the difference between the reference and target absolute diameters (of the tree as described with reference to FIG. 13, and of the fruit as described with reference to FIG. 14) may be due to differences in calibration of the sensor(s). However, the relative relationship between the reference and target diameters is unaffected by the differences in calibration.

As depicted in the graphs of FIG. 13 and FIG. 14, there is a detectable correlation between the target and reference fields in terms of the diameters of the trunks and/or fruit, and the growth of the trunk and/or the fruits. As is visually discernible, corresponds graphs of the target and reference fields show similar patterns at the same time intervals.

It is noted that based on the graphs of FIG. 13 and FIG. 14, during the first two weeks after initiating the irrigation at the target field based on the computed Kcd (which is computed according to sensor data of the reference field, as described herein), the growth rate (i.e., the trunk and/or fruit) of the target field was lower than for the reference GBI™ irrigated field. After the first two weeks, the reference and the target field grew at approximately within the same rate (i.e., within a non-significant difference). The growth pattern indicates that the growth rate of the target field was lower before starting irrigation based on the Kcd. When irrigation based on the Kcd was performed, the growth rate of the target field was approximately level with the growth rate of the reference GBI™ irrigated field. Therefore, it follows that irrigation based on the Kcd increased the growth rate of the target field to that of the reference field irrigated based on the GBI™ system.

Moreover, it is noted that based on the graphs of FIG. 13 and FIG. 14, the target growth rate of the target field (i.e., the trunk and/or fruit) exhibited larger fluctuations in comparison to the reference field. One possible explanation is that the reference field is irrigated at least one a day by the GBI™ system, while the target field was irrigated twice a week according to the growers schedule.

Inventors performed a third experiment using Sweet Corn during the middle of 2017 to evaluate some implementations of the systems, methods, and/or code instructions described herein. At the research station used by the inventors located in Kfar Yoshoua in northern Israel, a reference field was set for automated drip irrigation under control of the GBI™ system. A target field was sown with the same variety and seeding distances. However, the target field was sown at a delay of several days in comparison to the reference field. Moreover, the target field was geographically distinct with respect to the reference field, being located about 15 kilometers south east of the reference field (at Nir HaEmek). The objective of the experiment was to evaluate the operation and response of the implementation of the systems, methods, and/or code instructions described herein based on Degree-days when there are temporal differences between the reference field and the target field. A weather station was installed in each of the reference and the target fields to perform the evaluation according to Degree-days.

Due to differences in sowing date and weather conditions, the emergence of the target crops at the Target field (at Nir HaEmek) was 21 days after emergence of the reference crops at the Reference field being irrigated under GBI™ system.

Figure 15:
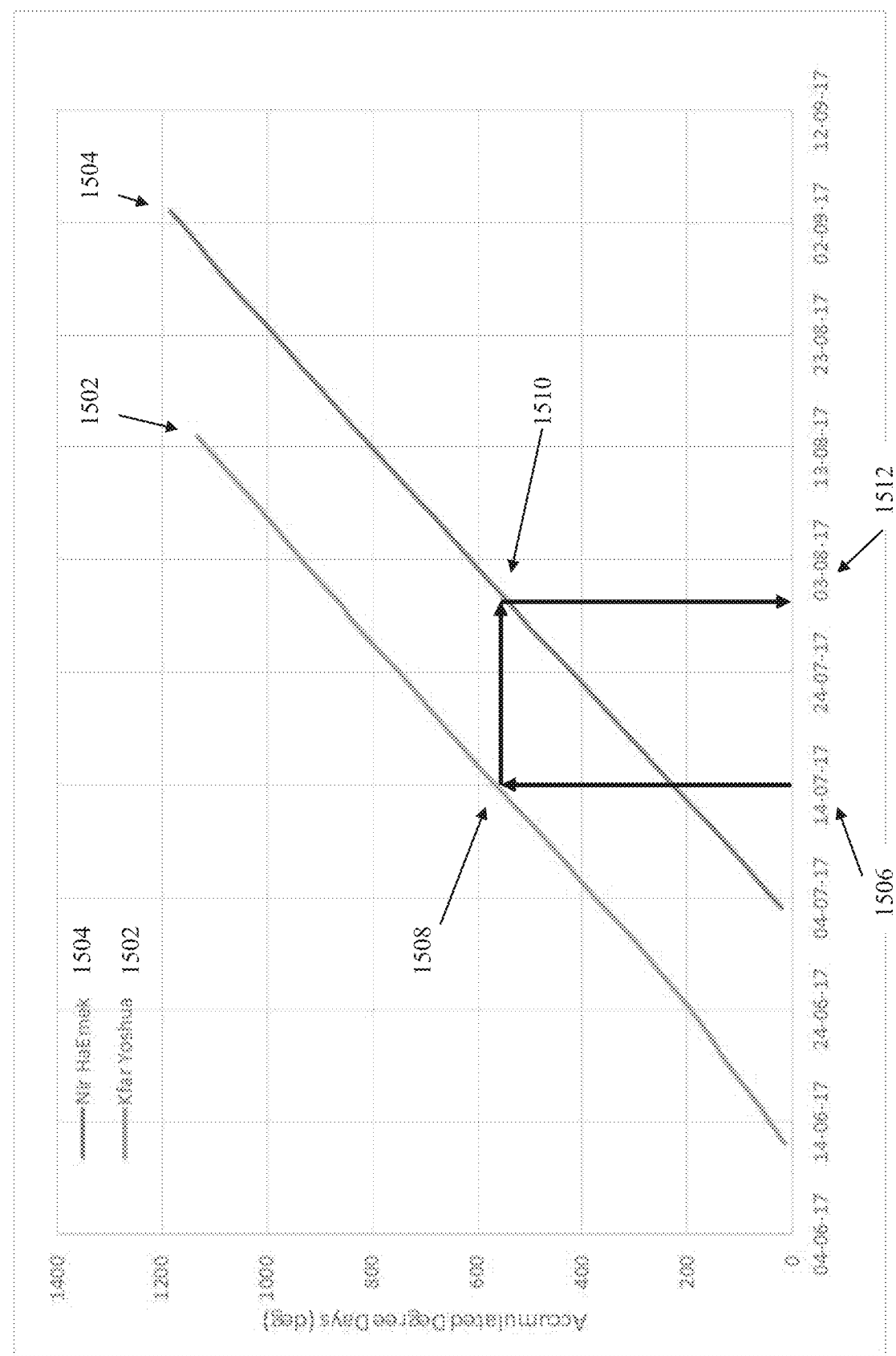
FIG. 15 is a graph depicting accumulated degree days starting from the emergence date for the target field and for the reference field, in accordance with some embodiments of the present invention.

Reference is now made to FIG. 15, which is a graph depicting accumulated degree days starting from the emergence date for the target field 1502 and for the reference field 1504, in accordance with some embodiments of the present invention. Based on curves 1502 and 1504 depicted with reference to FIG. 15, the Kcd may be computed and applied for reference and target crops that are sown with spaced apart time intervals (e.g., separated by multiple days and/or weeks). For example, for the case depicted with reference to FIG. 15, the Kcd is computed for the Kfar Yoshua 1502 reference field in mid July (depicted by element 1506) when almost 600 degree days have accumulated (depicted by element 1508) was applied to the target field at Nir Haemek 1504 when a corresponding number of degree days have accumulated (depicted by element 1510), which occurred at the beginning of August (depicted by element 1512).

The results of the third experiment provide evidence that the Kcd computed for a reference field which has been sowed earlier (in terms of days) than a target field may be applied to the target field at corresponding degree days. The Kcd computed for a certain degree days of the reference field is applied to the same (or within a tolerance range) number of degree days of the target field, even when the actual dates corresponding to the same degree days are spaced apart by several days or weeks.

Reference is now made to FIG. 16, which includes a graph 1602 of dynamic crop coefficient values for the reference field at Kfar Yoshua as a function of accumulated degree days and a graph 1604 of applied irrigation for the target field at Nir HaEmek planned by correlating days to the accumulated degree days at the reference field, in accordance with some embodiments. The dynamic crop coefficient of graph 1602 is computed based on a moving average of 7 days. Graph 1604 includes a curve 1606 of the dynamic crop coefficient values as a function of time, where the dynamic crop coefficient value for days of graph 1604 are computed according to corresponding degree days of graph 1602. Bars 1608 denote the irrigation event planned according to the dynamic crop coefficient values defined by curve 1606 and the prevailing evapotranspiration parameter at the Nir HaEmek target field. It is noted that irrigation was computed and applied twice a week due to irrigation capability limitations at the Nir HaEmek site.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors will be developed and the scope of the term sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method of computing at least one value of a dynamic crop coefficient of a reference crop for determining an irrigation plan of a target crop, comprising:

performing for a certain interval of time:
computing a value of a crop evapotranspiration parameter from electrical signals outputted by at least one crop evapotranspiration sensor and indicative of an amount of water consumed by a reference crop;
computing a value of a potential evapotranspiration parameter from electrical signals outputted by at least one potential evapotranspiration sensor and indicative of weather conditions associated with a reference field of the reference crop;
computing a value of a dynamic crop coefficient for the reference crop based on the value of the crop evapotranspiration parameter and the value of the potential evapotranspiration parameter, wherein the value of the dynamic crop coefficient is associated with the certain interval of time;

receiving a target interval of time of a target growing season; and providing the dynamic crop coefficient computed for the certain time interval of time during a certain growing season of the reference crop that corresponds to the target time interval of the target growing season of the target crop,
wherein the target crop is growing in a target field which is geographically distinct from the reference field where the reference crop is growing,
wherein instructions for irrigation of the target crop are according to an irrigation plan based on the dynamic crop coefficient computed for the reference crop and the potential evapotranspiration parameter of the target crop's location.

2. The method according to claim 1, wherein the target value of the crop evapotranspiration parameter is computed without output of a crop evapotranspiration sensor sensing an indication of the actual amount of water consumed by the target crop.

3. The method according to claim 1, wherein the irrigation of the target crop is computed based on the dynamic crop coefficient without output of a potential evapotranspiration sensor installed in the target field and without output of a crop evapotranspiration sensor installed in the target field, wherein the value of the potential evapotranspiration parameter is obtained from a remote data server.

4. The method according to claim 1, wherein the at least one crop evapotranspiration parameter is computed from output of a sensor that measures an indication of the amount of water used to irrigate the reference crop, wherein the reference crop is monitored by a system that measures plant growth and determines the amount of water used to irrigate the reference crop to avoid stress, wherein the amount of water used to irrigate the reference crop is statistically equivalent to the actual amount of water consumed by the reference crop.

5. The method according to claim 1, wherein the value of the dynamic crop coefficient is associated with a reference field profile including a crop species, a crop variety, and at least one parameter of growing conditions of the reference crop corresponding to the growing conditions where the at least one crop evapotranspiration sensor and the at least one potential evapotranspiration sensor perform measurements, and further comprising:
receiving a target field profile associated with the target crop; and
matching the target field profile to the reference field profile of the reference crop, wherein the dynamic crop coefficient is provided according to the matched field profile.

6. The method according to claim 5, further comprising adjusting the dynamic crop coefficient provided for the target crop according to a computed correction parameter that provides a statistical correlation between the target field profile of the target crop and the reference field profile associated with the reference crop of the provided dynamic crop coefficient.

7. The method according to claim 1,
wherein the value of the potential evapotranspiration parameter is obtained and/or computed based on data indicative of prevailing weather conditions for the geographical location of the reference crop,
and further comprising:
computing a target value of the potential evapotranspiration parameter from electrical signals outputted by at least one potential evapotranspiration sensor and indicative of prevailing weather conditions for the geographical location of the target field of the target crop;
computing a target value of the crop evapotranspiration parameter from the provided dynamic crop coefficient and the target value of the potential evapotranspiration parameter;
wherein the irrigation of the target crop is planned according to the target value of the crop evapotranspiration parameter.

8. The method according to claim 1, wherein the dynamic crop coefficient is computed for a certain degree day corresponding to the certain interval of time, and wherein the dynamic crop coefficient is provided for the certain degree day corresponding to the target time interval of the target growing season, wherein the certain interval of time and the target time interval are on different calendar days.

9. The method according to claim 1, further comprising transmitting the instructions for irrigation of the target crop to a controller of an automated irrigation system for automated irrigation of the target crop according to the irrigation plan.

10. The method according to claim 1, wherein the providing the dynamic crop coefficient, and outputting instructions for irrigation of the target crop are iterated over a plurality of different target time intervals.

11. The method according to claim 1, further comprising at least one of: computing a plurality of dynamic crop coefficient values over a plurality of intervals of time during the certain growing season, computing a plurality of dynamic crop coefficient values over a plurality of intervals of time over a plurality of growing seasons, and computing a plurality of dynamic crop coefficient values according to a plurality of combinations of parameters of the field profile.

12. The method according to claim 1, wherein the value of the crop evapotranspiration parameter denotes an indication of an actual amount of water consumed by the reference crop grown under optimal conditions without stress during the certain interval of time.

13. The method according to claim 1, wherein the value of the potential evapotranspiration parameter denotes a hypothetical grass reference crop resembling an extensive surface of green, well-watered grass of uniform height, actively growing, with full shade coverage of the ground.

14. The method according to claim 1, wherein the interval of time is one day or shorter, or seven days or shorter.

15. The method according to claim 1, wherein values for the dynamic crop coefficient are computed per day according to a moving average of a window size for an interval of time of seven days or shorter.

16. The method according to claim 1, wherein the crop evapotranspiration parameter is computed based on irrigation events according the at least one crop evapotranspiration sensor that measures the amount of water applied to the reference crop in an environment in which reference crop growth is measured and the amount of water used to irrigate the reference crop to avoid stress is computed by an automated monitoring system.

17. The method according to claim 1, wherein the value of the dynamic crop coefficient for the certain interval of time is computed by dividing the value of the crop evapotranspiration parameter by the value of the potential evapotranspiration parameter.

18. The method according to claim 1, wherein the field profile includes one or more of the following parameters: crop species, crop variety, geographical location, soil type, biomass development, nutritional condition, cultural management, company, field name, plot ID, location & coordinates, elevation, field type, greenhouse/open field/orchard/other, crop species and variety, planting date, agricultural produce purpose, spatial density, planting system, soil physical description, soil chemical description, irrigation method, irrigation flow rate, slope and slope exposure, yield nominal load, and canopy condition.

19. A system for computing at least one value of a dynamic crop coefficient of a reference crop for determining an irrigation plan of a target crop, comprising:
a non-transitory memory having stored thereon a code for execution by at least one hardware processor of a computing device, the code comprising:
code for performing for a certain interval of time:
computing a value of a crop evapotranspiration parameter from electrical signals outputted by at least one crop evapotranspiration sensor and indicative of an amount of water consumed by a reference crop;
computing a value of a potential evapotranspiration parameter from electrical signals outputted by at least one potential evapotranspiration sensor and indicative of weather conditions associated with a reference field of the reference crop;
computing a value of a dynamic crop coefficient for the reference crop based on the value of the crop evapotranspiration parameter and the value of the potential evapotranspiration parameter, wherein the value of the dynamic crop coefficient is associated with the certain interval of time;
code for receiving a target interval of time of a target growing season; and
code for providing the dynamic crop coefficient computed for the certain time interval of time during a certain growing season of the reference crop that corresponds to the target time interval of the target growing season of the target crop,
wherein the target crop is growing in a target field which is geographically distinct from the reference field where the reference crop is growing,
wherein instructions for irrigation of the target crop are according to an irrigation plan based on the dynamic crop coefficient computed for the reference crop and the potential evapotranspiration parameter of the target crop's location.

20. A computer program product for computing at least one value of a dynamic crop coefficient of a reference crop used to determine an irrigation plan of a target crop, comprising:
a non-transitory memory having stored thereon a code for execution by at least one hardware processor of a computing device, the code comprising:
instructions for performing for a certain interval of time:
computing a value of a crop evapotranspiration parameter from electrical signals outputted by at least one crop evapotranspiration sensor and indicative of an amount of water consumed by a reference crop;
computing a value of a potential evapotranspiration parameter from electrical signals outputted by at least one potential evapotranspiration sensor and indicative of weather conditions associated with a reference field of the reference crop;
computing a value of a dynamic crop coefficient for the reference crop based on the value of the crop evapotranspiration parameter and the value of the potential evapotranspiration parameter,
wherein the value of the dynamic crop coefficient is associated with the certain interval of time;
instructions for receiving a target interval of time of a target growing season; and
instructions for providing the dynamic crop coefficient computed for the certain time interval of time during a certain growing season of the reference crop that corresponds to the target time interval of the target growing season of the target crop,
wherein the target crop is growing in a target field which is geographically distinct from the reference field where the reference crop is growing,
wherein instructions for irrigation of the target crop are according to an irrigation plan based on the dynamic crop coefficient computed for the reference crop and the potential evapotranspiration parameter of the target crop's location.

* * * * *